(12) United States Patent
Sasata et al.

(10) Patent No.: US 11,454,752 B2
(45) Date of Patent: Sep. 27, 2022

(54) OPTICAL ELEMENT, METHOD FOR FORMING PHOTO-ALIGNMENT PATTERN, AND METHOD FOR MANUFACTURING OPTICAL ELEMENT

(71) Applicant: FUJIFILM Corporation, Tokyo (JP)

(72) Inventors: Katsumi Sasata, Kanagawa (JP); Ryoji Goto, Kanagawa (JP); Hiroshi Sato, Kanagawa (JP); Yukito Saitoh, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/158,710

(22) Filed: Jan. 26, 2021

(65) Prior Publication Data

US 2021/0149098 A1   May 20, 2021

Related U.S. Application Data

(63) Continuation of application No. PCT/JP2019/029482, filed on Jul. 26, 2019.

(30) Foreign Application Priority Data

Jul. 27, 2018  (JP) .............................. JP2018-141677

(51) Int. Cl.
*G02B 5/30* (2006.01)
(52) U.S. Cl.
CPC .................................. *G02B 5/3016* (2013.01)
(58) Field of Classification Search
CPC ... G02B 5/3016; G02B 5/3083; G02B 5/1833
See application file for complete search history.

(56) References Cited

U.S. PATENT DOCUMENTS

2007/0040963 A1   2/2007  Maruyama et al.
2010/0231847 A1   9/2010  Escuti
(Continued)

FOREIGN PATENT DOCUMENTS

JP   2005-15406 A       1/2005
JP   2005015406 A  *    1/2005
(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2019/029482, dated Feb. 11, 2021.
(Continued)

*Primary Examiner* — Nathanael R Briggs
(74) *Attorney, Agent, or Firm* — Birch, Stewart, Kolasch & Birch, LLP

(57) ABSTRACT

Provided are an optical element including a first optically-anisotropic layer consisting of a cured layer of a composition including a first liquid crystal compound, in which the first optically-anisotropic layer has 0.24 or more of a refractive index anisotropy $\Delta n_{550}$ which is measured with light having a wavelength of 550 nm, the first optically-anisotropic layer has a first liquid crystal alignment pattern in which a direction of an optical axis derived from the first liquid crystal compound continuously changes rotationally in at least one in-plane direction, and in the first liquid crystal alignment pattern, in a case where a length $\Lambda$ over which the direction of the optical axis rotates 180° in a plane is defined as a single period, the length $\Lambda$ of the single period is 1.6 μm or less; a method for forming a photo-alignment pattern; and a method for manufacturing an optical element.

7 Claims, 7 Drawing Sheets

(56) References Cited

U.S. PATENT DOCUMENTS

| | | | |
|---|---|---|---|
| 2011/0262844 A1 | 10/2011 | Tabirian et al. | |
| 2013/0130156 A1 | 5/2013 | Escuti | |
| 2016/0033698 A1* | 2/2016 | Escuti ................ | G02B 5/3016 |
| | | | 349/186 |
| 2017/0373459 A1 | 12/2017 | Weng et al. | |
| 2019/0177268 A1 | 6/2019 | Fukushima et al. | |

FOREIGN PATENT DOCUMENTS

| | | |
|---|---|---|
| JP | 2007-79534 A | 3/2007 |
| JP | 2010-525395 A | 7/2010 |
| JP | 5651753 B2 | 1/2015 |
| JP | 2017-522601 A | 8/2017 |
| WO | WO 2018/034216 A1 | 2/2018 |

OTHER PUBLICATIONS

International Search Report (Form PCT/ISA/210) for International Application No. PCT/JP2019/029482, dated Oct. 8, 2019, with English translation.

Japanese Office Action for corresponding Japanese Application No. 2020-532510, dated Jul. 13, 2021, with English translation.

\* cited by examiner

OPTICAL ELEMENT, METHOD FOR FORMING PHOTO-ALIGNMENT PATTERN, AND METHOD FOR MANUFACTURING OPTICAL ELEMENT

CROSS-REFERENCE TO RELATED APPLICATIONS

This application is a continuation application of International Application No. PCT/JP2019/029482, filed Jul. 26, 2019, the disclosure of which is incorporated herein by reference in its entirety. Further, this application claims priority from Japanese Patent Application No. 2018-141677, filed Jul. 27, 2018, the disclosure of which is incorporated herein by reference in its entirety.

BACKGROUND OF THE INVENTION

1. Field of the Invention

The present invention relates to an optical element, a method for forming a photo-alignment pattern using an optical element, and a method for manufacturing a new optical element using an optical element.

2. Description of the Related Art

In many optical devices or systems, polarized light has been utilized, and optical elements for controlling reflection, collection, divergence, or the like of the polarized light have been developed.

JP2017-522601A (hereinafter, referred to as Patent Document 1) discloses an optical diffraction element which is formed by patterning a thin film including a liquid crystal compound and having optical anisotropy.

JP5651753B (hereinafter, referred to as Patent Document 2) discloses a method of patterning an alignment layer by photolithography using a polymerizable liquid crystal mask layer patterned by holography.

SUMMARY OF THE INVENTION

For the element disclosed in Patent Document 1, which changes an alignment pattern of a rod-shaped liquid crystal compound in a plane to diffract light, application to an optical member such as an augmented reality (AR) image projection device has been expected.

However, in the alignment pattern using a known liquid crystal compound in the related art, there is a problem in that, in a case where the diffraction angle increases, the diffraction efficiency decreases, that is, the intensity of diffracted light decreases. Therefore, there is a demand for an optical element capable of obtaining diffracted light with a large diffraction angle and high diffraction efficiency.

In addition, in a case of patterning the alignment layer using the polymerizable liquid crystal mask layer disclosed in Patent Document 2, it has been clarified by the studies of the present inventors that the formation accuracy differs depending on the thickness of the mask layer.

The present disclosure has been made in view of the above-described circumstances, and an object of the present disclosure is to provide an optical element capable of obtaining diffracted light with a large diffraction angle and a higher diffraction efficiency than the related art, a method for forming a photo-alignment pattern using the optical element, and a method for manufacturing a new optical element using the optical element.

Specific means for achieving the above-described objects include the following aspects.

<1> An optical element comprising:

a first optically-anisotropic layer consisting of a cured layer of a composition including a first liquid crystal compound, in which the first optically-anisotropic layer has 0.24 or more of a refractive index anisotropy $\Delta n_{550}$ which is measured with light having a wavelength of 550 nm, the first optically-anisotropic layer has a first liquid crystal alignment pattern in which a direction of an optical axis derived from the first liquid crystal compound continuously changes rotationally in at least one in-plane direction, and in the first liquid crystal alignment pattern, in a case where a length $\Lambda$ over which the direction of the optical axis rotates 180° in a plane is defined as a single period, the length $\Lambda$ of the single period is 1.6 m or less.

<2> The optical element according to <1>, in which the length $\Lambda$ of the single period is 1 μm or less.

<3> The optical element according to <1> or <2>, in which a film thickness d of the first optically-anisotropic layer is 1 μm or less.

<4> The optical element according to any one of <1> to <3>, in which the first optically-anisotropic layer has 310 nm or less of a wavelength $\lambda_{max}$ at which a maximum molar light absorption coefficient is exhibited, and 350 nm or less of a wavelength $\lambda(1000)$ at which 1000 of a molar light absorption coefficient is exhibited.

<5> The optical element according to any one of <1> to <4>, in which the first liquid crystal compound is a compound represented by Formula (I),

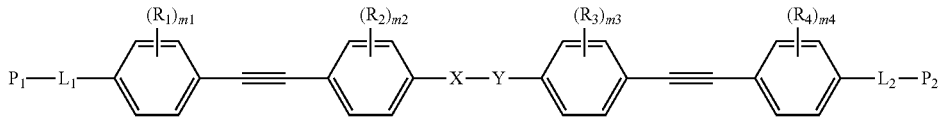

Formula (I)

in Formula (I), $P_1$ and $P_2$ each independently represent a polymerizable group, $L_1$ and $L_2$ each independently represent a single bond or a divalent linking group, X represents $-C(R_{xa})(R_{xb})-$, in which $R_{xa}$ and $R_{xb}$ each independently represent a hydrogen atom or a substituent, Y represents $-C(R_{ya})(R_{yb})-$, $-O-$, $-NR_{yn}-$, or $-S-$, in which $R_{ya}$ and $R_{yb}$ each independently represent a hydrogen atom or a substituent, and $R_{yn}$ represents a hydrogen atom or an alkyl group having 1 to 6 carbon atoms, $R_1$ to $R_4$ each independently represent a substituent, $m_1$ to $m_4$ each independently represent an integer of 0 to 4, and in a case where $R_1$ to $R_4$ are each present in plurality, $R_1$'s to $R_4$'s each may be the same or different from each other.

<6> The optical element according to any one of <1> to <5>, in which the first liquid crystal compound is cholesterically aligned in a thickness direction.

<7> A method for forming a photo-alignment pattern, the method comprising:

arranging, as a birefringent mask, the optical element according to any one of <1> to <6> to face a photo-alignment film; and irradiating the photo-alignment film with light through the birefringent mask to form, on a surface of the photo-alignment film, a photo-alignment pattern corresponding to the first liquid crystal alignment pattern of the optical element.

<8> A method for manufacturing an optical element using the method for forming a photo-alignment pattern according to <7>.

<9> A method for manufacturing an optical element, the method comprising:

forming a photo-alignment film on one surface of a support, arranging, as a birefringent mask, the optical element according to any one of <1> to <6> to face the photo-alignment film, and irradiating the photo-alignment film with light through the birefringent mask to form, on a surface of the photo-alignment film, a photo-alignment pattern corresponding to the first liquid crystal alignment pattern of the optical element, and coating the surface of the photo-alignment film, on which the photo-alignment pattern has been formed, with a composition including a second liquid crystal compound and curing the composition to form the second optically-anisotropic layer consisting of a cured layer of the composition and having a second liquid crystal alignment pattern corresponding to the photo-alignment pattern, thereby manufacturing an optical element having a second optically-anisotropic layer.

<10> The method for manufacturing an optical element according to <9>, in which a compound represented by Formula (I) is used as the second liquid crystal compound, According to the present disclosure, it is possible to provide an optical element capable of obtaining diffracted light with a large diffraction angle and a higher diffraction efficiency than the related art. In addition, it is possible to provide a method for forming a photo-alignment pattern using the optical element, and a method for manufacturing a new optical element using the optical element.

Formula (I)

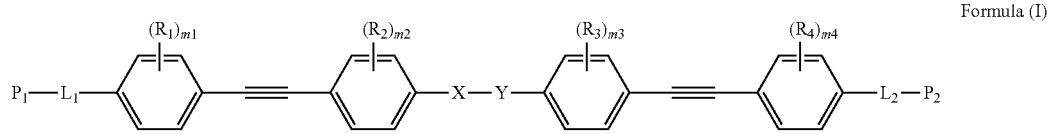

in Formula (I), $P_1$ and $P_2$ each independently represent a polymerizable group, $L_1$ and $L_2$ each independently represent a single bond or a divalent linking group, X represents —$C(R_{xa})(R_{xb})$—, in which $R_{xa}$ and $R_{xb}$ each independently represent a hydrogen atom or a substituent, Y represents —$C(R_{ya})(R_{yb})$—, —O—, —$NR_{yn}$—, or —S—, in which $R_{ya}$ and $R_{yb}$ each independently represent a hydrogen atom or a substituent, and $R_{yn}$ represents a hydrogen atom or an alkyl group having 1 to 6 carbon atoms, $R_1$ to $R_4$ each independently represent a substituent, $m_1$ to $m_4$ each independently represent an integer of 0 to 4, and in a case where $R_1$ to $R_4$ are each present in plurality, $R_1$'s to $R_4$'s each may be the same or different from each other.

DESCRIPTION OF THE PREFERRED EMBODIMENTS

Hereinafter, an embodiment of an optical element according to the present invention will be described with reference to the drawings. In each of the drawings, for easy visual recognition, the reduced scale of components is different from the actual scale. In the present specification, numerical ranges represented by "to" include numerical values before and after "to" as lower limit values and upper limit values. In addition, "perpendicular" or "parallel" regarding an angle represents a range of the exact angle t 10°.

In the present specification, Re($\lambda$) represents an in-plane retardation at a wavelength $\lambda$. Unless specified otherwise, the wavelength $\lambda$ is 550 nm.

In the present specification, Re(λ) is a value measured at the wavelength λ using AxoScan (manufactured by Axometrics, Inc.). By inputting an average refractive index ((nx+ny+nz)/3) and a film thickness (d (μm)) to AxoScan, the following expressions can be calculated.

Slow Axis Direction (°)

$Re(λ)=R0(λ)$

R0(λ) is expressed as a numerical value calculated by AxoScan and represents Re(λ).

[Optical Element]

Figure 1:
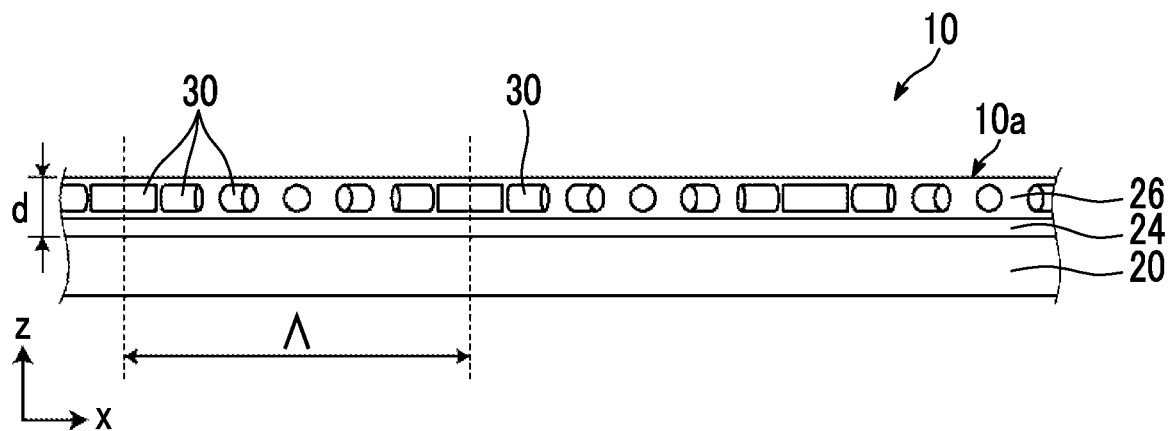
FIG. 1 is a view schematically showing an embodiment of the optical element according to the present invention.
Figure 2:
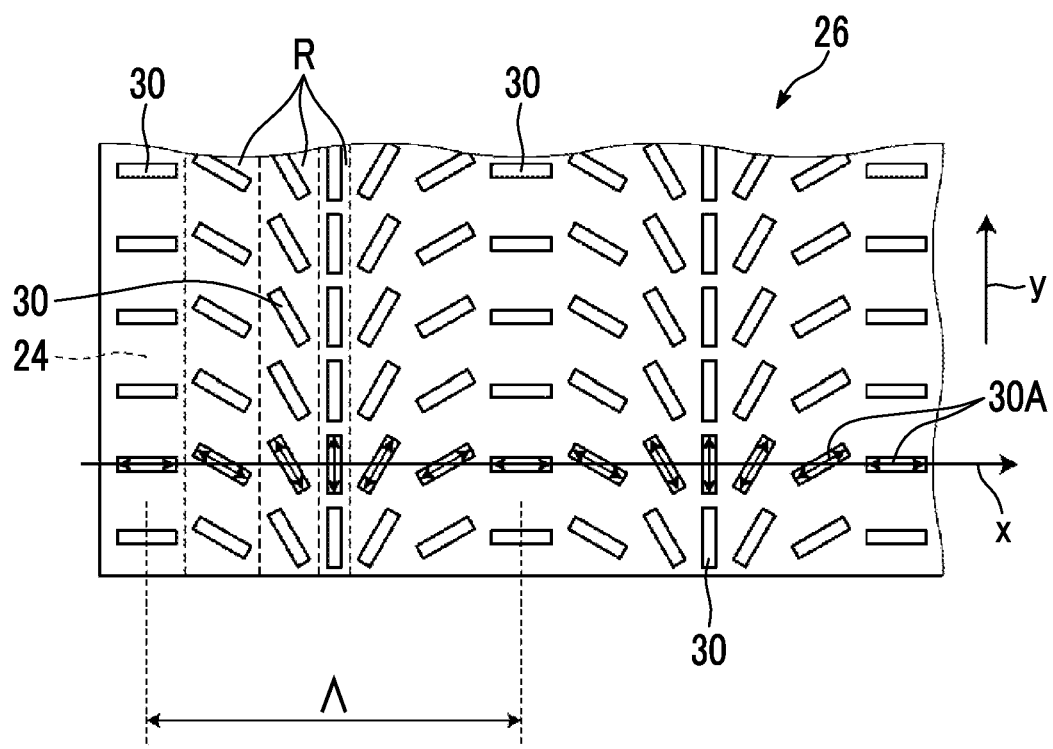
FIG. 2 is a schematic plan view showing an optically-anisotropic layer of the optical element shown in FIG. 1.

FIGS. 1 and 2 schematically show an embodiment of the optical element according to the present invention. FIG. 1 is a side view showing a laminated structure of an optical element, and FIG. 2 is a plan view schematically showing a liquid crystal alignment pattern in the optical element 10 shown in FIG. 1. In the drawings, a sheet plane of the sheet-shaped optical element 10 will be defined as "xy plane", and a thickness direction will be defined as "z direction".

As shown in FIG. 1, the optical element 10 of one embodiment includes a support 20, an alignment film 24, and a first optically-anisotropic layer 26 consisting of a cured layer of a composition including a first liquid crystal compound 30. The optical element 10 shown in the drawing includes the support 20 and the alignment film 24, but the support 20 may be peeled off from the optical element 10 such that only the alignment film and the optically-anisotropic layer configure the optical element according to the embodiment of the present disclosure. In addition, the alignment film may also be peeled off from the above-described configuration such that only the optically-anisotropic layer configures the optical element according to the embodiment of the present disclosure.

The first optically-anisotropic layer 26 has 0.24 or more of a refractive index anisotropy $Δn_{550}$ which is measured with light having a wavelength of 550 nm, and has a first liquid crystal alignment pattern in which a direction of an optical axis derived from the first liquid crystal compound 30 continuously changes rotationally in at least one in-plane direction. In addition, in the first liquid crystal alignment pattern, in a case where a length Λ over which the direction of the optical axis rotates 180° in a plane is defined as a single period, the length Λ of the single period is 1.6 μm or less.

In FIG. 1 (and FIGS. 3 and 4 described later), in order to simplify the drawing and to clarify the configuration of the optical element 10, only the liquid crystal compound 30 (liquid crystal compound molecules) on a surface of the alignment film is shown in the first optically-anisotropic layer 26. However, the first optically-anisotropic layer 26 has a structure in which the aligned liquid crystal compounds 30 are laminated same as in an optically-anisotropic layer which is formed using a composition including a normal liquid crystal compound. Hereinafter, the first optically-anisotropic layer 26 will be also simply referred to as an optically-anisotropic layer 26.

As described above, the optically-anisotropic layer 26 is an optically-anisotropic layer formed using a composition including a liquid crystal compound. In a case where a value of a in-plane retardation is set as λ/2, the optically-anisotropic layer 26 has a function as a general λ/2 plate, that is, a function of imparting a phase difference of a half wavelength, that is, 180° to two linearly polarized light components which are included in light incident into the optically-anisotropic layer and are perpendicular to each other.

As shown in FIG. 2, in a plane of the optically-anisotropic layer 26, the optically-anisotropic layer 26 has a liquid crystal alignment pattern in which one direction of an optical axis 30A derived from the liquid crystal compound 30 changes while continuously rotating in one direction. Here, the one direction in which the optical axis 30A rotates and changes match a direction of an x-axis in the xy plane. In the present embodiment, the one direction in which the optical axis 30A rotates and changes will be described as an x direction.

The optical axis 30A derived from the liquid crystal compound 30 is an axis having the highest refractive index in the liquid crystal compound 30, that is, a so-called slow axis. As shown in FIG. 1, in a case where the liquid crystal compound 30 is a rod-shaped liquid crystal compound, the optical axis 30A is along a rod-shaped major axis direction.

In the following description, the optical axis 30A derived from the liquid crystal compound 30 will also be referred to as the optical axis 30A of the liquid crystal compound 30, or simply referred to as the optical axis 30A.

In the schematic plan view of the optical element 10 shown in FIG. 2, in order to clarify the configuration of the optical element 10, same as in FIG. 1, only the liquid crystal compound 30 on the surface of the alignment film 24 is schematically shown.

Specifically, the direction of the optical axis 30A changes while continuously rotating in the x direction means that an angle between the optical axis 30A of the liquid crystal compound 30, which is arranged along the x direction, and the x direction varies depending on positions in the x direction, and the angle between the optical axis 30A and the x direction sequentially changes from θ to θ+180° or θ−180° in the x direction. Here, the expression "the angle sequentially changes" means that the angle may change at constant angular intervals, or may change continuously. However, a difference between the angles of the optical axes 30A of the liquid crystal compound 30 adjacent to each other in the x direction is preferably 45° or less, more preferably 150 or less, and still more preferably less than 15°.

On the other hand, regarding the liquid crystal compound 30 forming the optically-anisotropic layer 26, the liquid crystal compounds 30 having the same direction of the optical axes 30A are arranged at regular intervals in a y direction perpendicular to the x direction in a plane, that is, a y direction perpendicular to the one direction (x direction) in which the optical axis 30A continuously rotates.

In other words, regarding the liquid crystal compound 30 forming the optically-anisotropic layer 26, in the liquid crystal compounds 30 arranged in the y direction, angles between the direction of the optical axis 30A and the x direction are the same.

In the optical element 10, in such a liquid crystal alignment pattern of the liquid crystal compound 30, the length (distance) over which the optical axis 30A of the liquid crystal compound 30 rotates 180° in the x direction in which the direction of the optical axis 30A changes while continuously rotating in a plane is defined as the length Λ of the single period in the liquid crystal alignment pattern. In other words, the length of the single period in the liquid crystal alignment pattern is defined as the distance between θ and θ+180° that is a range of the angle between the optical axis 30A of the liquid crystal compound 30 and the x direction. Specifically, as shown in FIG. 2, a distance of centers in the x direction of two liquid crystal compounds 30 in which the x direction and the direction of the optical axis 30A match each other is defined as the length Λ of the single period. In the following description, the length Λ of the single period will also be referred to as "single period Λ", or simply referred to as "period Λ".

In the optical element 10 according to the embodiment of the present disclosure, the liquid crystal alignment pattern of the optically-anisotropic layer 26 is a pattern in which the liquid crystal alignment of this single period Λ is repeated in the x direction.

As described above, in the optically-anisotropic layer 26, in the liquid crystal compounds 30 arranged in the y direction, the angles between the optical axes 30A thereof and the x direction in which the direction of the optical axis of the liquid crystal compound 30 rotates are the same. Regions where the liquid crystal compounds 30 in which the angles between the optical axes 30A and the x direction are the same are arranged in the y direction will be referred to as "regions R".

In this case, a value of the in-plane retardation (Re) in each region R is preferably a half wavelength of light (hereinafter, referred to as a target light) to be diffracted by the optical element, that is, in a case where a wavelength of the target light is λ, the in-plane retardation Re is preferably λ/2. The in-plane retardation is calculated from the product of a refractive index anisotropy Δn of the regions R and the thickness (film thickness) d of the optically-anisotropic layer. Here, a difference in refractive index due to the refractive index anisotropy of the regions R in the optically-anisotropic layer is defined by a difference between a refractive index of a direction of an in-plane slow axis of the region R and a refractive index of a direction perpendicular to the direction of the slow axis. That is, the difference Δn in refractive index due to the refractive index anisotropy of the regions R is the same as a difference between a refractive index of the liquid crystal compound 30 in the direction of the optical axis 30A and a refractive index of the liquid crystal compound 30 in a direction perpendicular to the optical axis 30A in a plane of the region R. That is, the above-described difference Δn in refractive index depends on the liquid crystal compound, and the in-plane retardation of each region R is substantially the same. However, as described above, each region R has a different direction of the optical axis 30A.

In the optically-anisotropic layer 26, since the direction of the optical axis 30A rotates in the plane, it is difficult to measure the in-plane retardation as a whole. The in-plane retardation can be obtained by applying a composition which is a raw material of the optically-anisotropic layer 26 onto a separately prepared support with an alignment film for measurement, horizontally aligning and immobilizing the optical axis of the liquid crystal compound to the surface of the support, and measuring a retardation value and a film thickness of the obtained cured layer.

The in-plane retardation of the optically-anisotropic layer 26 can be estimated from the period and the diffraction efficiency.

In a case where circularly polarized light is incident into such an optically-anisotropic layer 26, the light is refracted and a direction of the circularly polarized light is changed.

Figure 3:
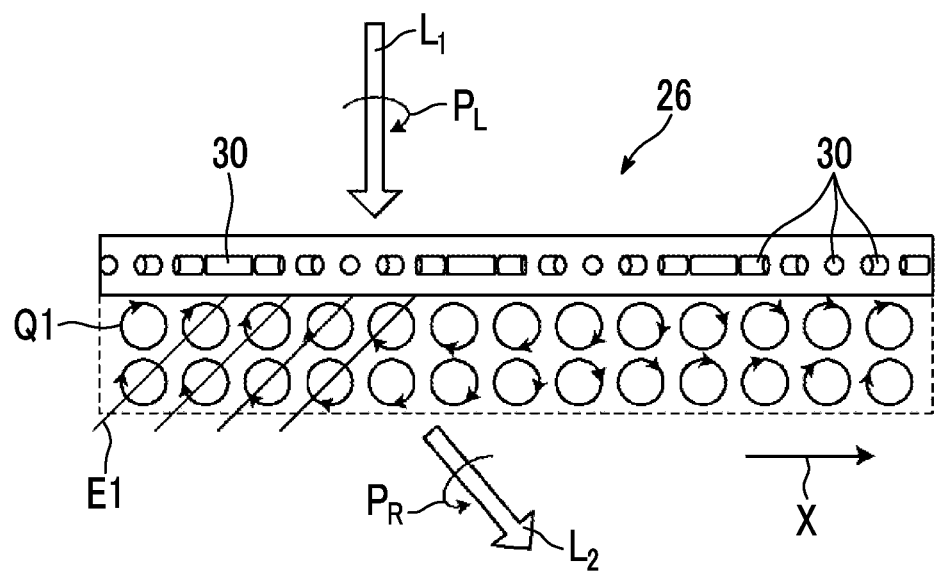
FIG. 3 is a conceptual diagram showing the action of the optically-anisotropic layer of the optical element shown in FIG. 1.

This action is conceptually shown in FIG. 3 by exemplifying the optically-anisotropic layer 26. It is assumed that the in-plane retardation of the optically-anisotropic layer 26 is λ/2.

In this case, as shown in FIG. 3, in a case where an incidence light $L_1$ as left circularly polarized light $P_L$ is incident into the optically-anisotropic layer 26, the incidence light $L_1$ transmits through the optically-anisotropic layer 26 to be given a phase difference of 180° so that a transmitted light $L_2$ is converted into right circularly polarized light PR.

In addition, in a case where the incidence light $L_1$ transmits through the optically-anisotropic layer 26, an absolute phase thereof changes depending on the direction of the optical axis 30A of each liquid crystal compound 30. At this time, since the direction of the optical axis 30A changes while rotating in the x direction, the amount of change in absolute phase of the incidence light $L_1$ varies depending on the direction of the optical axis 30A. Furthermore, the liquid crystal alignment pattern formed in the optically-anisotropic layer 26 is a pattern which is periodic in the x direction. Therefore, as shown in FIG. 3, the incidence light $L_1$ transmitted through the optically-anisotropic layer 26 is imparted with an absolute phase $Q_1$ which is periodic in the x direction corresponding to the direction of each optical axis 30A. As a result, an equiphase plane E1 which is tilted in a direction opposite to the x direction is formed.

Therefore, the transmitted light $L_2$ is refracted to be tilted in a direction perpendicular to the equiphase plane E1 and travels in a direction different from a traveling direction of the incidence light $L_1$. In this way, the incidence light $L_1$ of the left circularly polarized light $P_L$ is converted into the transmitted light $L_2$ of the right circularly polarized light PR which is tilted by a predetermined angle in the x direction with respect to an incidence direction.

Figure 4:
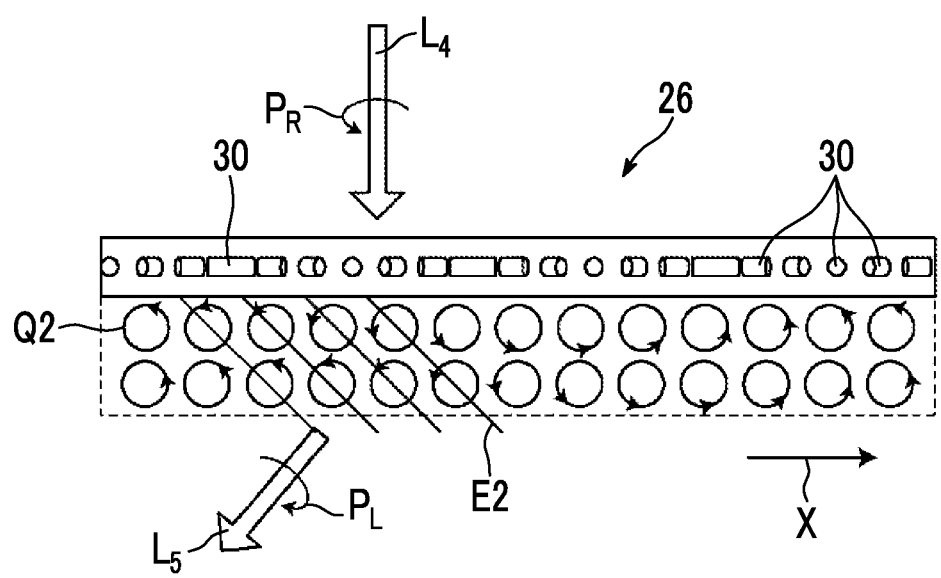
FIG. 4 is a conceptual diagram showing the action of the optically-anisotropic layer of the optical element shown in FIG. 1.

On the other hand, as conceptually shown in FIG. 4, in a case where an incidence light $L_4$ of right circularly polarized light $P_R$ is incident into the optically-anisotropic layer 26 having the same in-plane retardation, the incidence light $L_4$ transmits through the optically-anisotropic layer 26 to be given a phase difference of 180° so that the incidence light $L_4$ is converted into a transmitted light $L_5$ of left circularly polarized light $P_L$.

In addition, in a case where the incidence light $L_4$ transmits through the optically-anisotropic layer 26, an absolute phase thereof changes depending on the direction of the optical axis 30A of each liquid crystal compound 30. At this time, since the direction of the optical axis 30A changes while rotating in the x direction, the amount of change in absolute phase of the incidence light $L_4$ varies depending on the direction of the optical axis 30A. Furthermore, the liquid crystal alignment pattern formed in the optically-anisotropic layer 26 is a pattern which is periodic in the x direction. Therefore, as shown in FIG. 4, the incidence light $L_4$ transmitted through the optically-anisotropic layer 26 is imparted with an absolute phase Q2 which is periodic in the x direction corresponding to the direction of each optical axis 30A.

Here, the incidence light $L_4$ is right circularly polarized light $P_R$. Therefore, the absolute phase Q2 which is periodic in the x direction corresponding to the direction of the optical axis 30A is opposite to the incidence light $L_1$ as left circularly polarized light $P_L$. As a result, in the incidence light $L_4$, an equiphase plane E2 which is tilted in the x direction opposite to that of the incidence light $L_1$ is formed.

Therefore, the incidence light $L_4$ is refracted to be tilted in a direction perpendicular to the equiphase plane E2 and travels in a direction different from a traveling direction of the incidence light $L_4$. In this way, the incidence light $L_4$ is converted into the transmitted light $L_5$ of left circularly polarized light which is tilted by a predetermined angle in a direction opposite to the x direction with respect to an incidence direction.

As described above, in the optically-anisotropic layer 26, the value of the in-plane retardation is preferably half the wavelength of the target light. This is because that, as the value of the in-plane retardation is closer to the half wavelength of the target light, high diffraction efficiency can be obtained in the diffraction of the target light. The in-plane retardation $Re(\lambda)=\Delta n_\lambda \times d$ of the optically-anisotropic layer with respect to incidence light having a wavelength in the x direction of λ nm is preferably within a range defined by the following expression and can be appropriately set.

$$0.7\times(\lambda/2)\ nm \leq \Delta n_\lambda \times d \leq 1.3\times(\lambda/2)\ nm$$

Here, by changing the single period Λ of the liquid crystal alignment pattern formed in the optically-anisotropic layer 26, refraction angles of the transmitted light $L_2$ and $L_5$ can be adjusted. Specifically, as the single period Λ of the liquid crystal alignment pattern decreases, light transmitted through the liquid crystal compounds 30 adjacent to each other more strongly interfere with each other. Therefore, the transmitted light $L_2$ and $L_5$ can be more largely refracted. Furthermore, by reversing a rotation direction of the optical axis 30A of the liquid crystal compound 30 which rotates in the x direction, a refraction direction of the transmitted light can be reversed. The period Λ is preferably 1 μm or less and more preferably 0.8 μm or less.

Since the refractive index anisotropy Δn is 0.24 or more, sufficient diffraction efficiency can be obtained even in a range where the period Λ is as small as 1.6 μm or less.

It is sufficient that the film thickness d of the optically-anisotropic layer 26 is appropriately set in order to obtain a desired in-plane retardation, but the film thickness d is preferably 1 μm or less, more preferably 0.8 μm or less, and still more preferably 0.5 μm or less. In particular, in a case where the optical element is used as a birefringent mask for forming a photo-alignment pattern, a smaller film thickness d is preferable. As the film thickness d is smaller, a formation accuracy of the photo-alignment pattern can be improved.

The ratio Λ/d of the period Λ to the film thickness d of the optically-anisotropic layer is preferably 1 or more.

The period Λ of the liquid crystal alignment pattern in the optically-anisotropic layer 26 can be obtained from a period of light and dark by observing bright and dark period pattern of bright portions and dark portions with a polarizing microscope under a condition of crossed nicols. Twice the period of the observed bright and dark period pattern corresponds to the period Λ of the liquid crystal alignment pattern.

In addition, the film thickness d of the optically-anisotropic layer 26 can be measured by, for example, observing a cross section of the optically-anisotropic layer with a scanning electron microscope.

In addition, it is preferable that the liquid crystal compound used in the optically-anisotropic layer 26 has 310 nm or less of a wavelength λmax at which the maximum molar light absorption coefficient is exhibited, and 350 nm or less of a wavelength λ(1000) at which 1000 of a molar light absorption coefficient ε is exhibited. The optically-anisotropic layer 26 satisfying above can suppress colorability, which is preferable.

The wavelength λmax at which the maximum molar light absorption coefficient of the liquid crystal compound is exhibited and the wavelength λ(1000) at which 1000 of the molar light absorption coefficient e is exhibited can be calculated from a solution absorption spectrum as follows.

The solution absorption spectrum of each compound is measured using a spectrophotometer UV-3100PC manufactured by Shimadzu Corporation. A solution in which a predetermined amount of a compound is dissolved using chloroform as a solvent is measured in a 1 cm cell, and λmax and λ(1000) are calculated from the obtained spectrum and the molecular weight.

By forming an alignment film on the support 20, applying a composition including the liquid crystal compound onto the alignment film, and curing the composition, the optically-anisotropic layer consisting of a cured layer of the composition can be obtained.

The composition for forming the optically-anisotropic layer includes a first liquid crystal compound, and may further include other components such as other liquid crystal compounds, a leveling agent other than liquid crystal compounds, an alignment controller, a polymerization initiator, or an alignment assistant. Hereinafter, components included in the composition will be described in detail.

<<Composition>>

—First Liquid Crystal Compound—

The type of the first liquid crystal compound is not particularly limited as long as it can be realized that an optically-anisotropic layer consisting of a cured layer of a composition including the liquid crystal compound has 0.24 or more of the refractive index anisotropy $\Delta n_{550}$. The first liquid crystal compound may be a rod-shaped liquid crystal compound or a disk-shaped liquid crystal compound. In addition, a mixture of two or more kinds of the rod-shaped liquid crystal compounds, two or more kinds of the disk-shaped liquid crystal compounds, or the rod-shaped liquid crystal compound and the disk-shaped liquid crystal compound may be used.

In the present specification, "(meth)acryloyloxy group" is a notation representing both acryloyloxy group and methacryloyloxy group.

In a notation for a group (atomic group) in the present specification, in a case where the group is denoted without specifying whether it is substituted or unsubstituted, the group includes both a group having no substituent and a group having a substituent. For example, "alkyl group" includes not only an alkyl group having no substituent (unsubstituted alkyl group), but also an alkyl group having a substituent (substituted alkyl group).

In the present specification, in a case of simply referring to a substituent, examples of the substituent include the following substituent T.

(Substituent T)

Examples of the substituent T include a halogen atom, an alkyl group, a cycloalkyl group, an alkenyl group, a cycloalkenyl group, an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an amino group (including an alkylamino group and an anilino group), an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imido group, a phosphino group, a phosphinyl group, a phosphinyloxy group, a phosphinylamino group, and a silyl group.

Among the above-described substituents, a substituent having a hydrogen atom may be further substituted with any of the above-described substituents in the portion of the hydrogen atom in the substituent.

Particularly preferred examples of the first liquid crystal compound will be described below. The first liquid crystal compound is particularly preferably a compound represented by Formula (I) (hereinafter, referred to as a "compound A"). By using this compound A, both high refractive index anisotropy Δn and suppression of colorability can be achieved. The reason why such an effect is obtained is not clear, but it is considered that, by linking a tolan skeleton with a specific linking group, the refractive index anisotropy Δn is improved without lengthening an absorption wavelength of the compound.

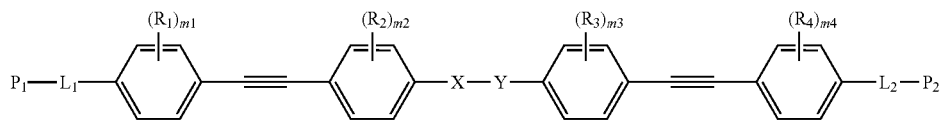

Formula (I)

In Formula (I), $P_1$ and $P_2$ each independently represent a polymerizable group.

The type of the polymerizable group is not particularly limited and examples thereof include a known polymerizable group. However, from the viewpoint of reactivity, the polymerizable group is preferably a functional group capable of an addition polymerization reaction and more preferably a polymerizable ethylenically unsaturated group or a ring-opening polymerizable group. Examples of the polymerizable group include a (meth)acryloyloxy group, a vinyl group, a maleimide group, an acetyl group, a styryl group, an allyl group, an epoxy group, an oxetane group, and a group including these groups. A hydrogen atom in each of the above-described groups may be substituted with another substituent such as a halogen atom.

Suitable specific examples of the polymerizable group include groups represented by Formulae (P-1) to (P-19). * in the following formulae represents a bonding position.

(P-1)
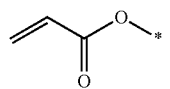

(P-2)
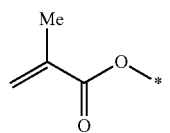

(P-3)
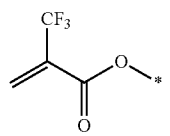

(P-4)
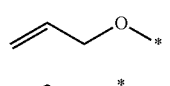

(P-5)
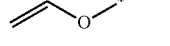

(P-6)
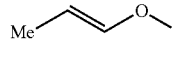

(P-7)
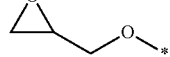

(P-8)
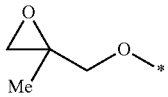

(P-9)

-continued (P-10)
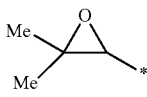

(P-11)
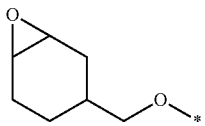

(P-12)
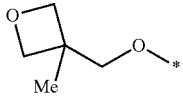

(P-13)
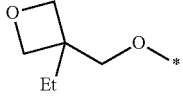

(P-14)
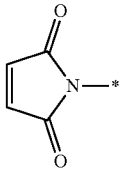

(P-15)
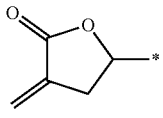

(P-16)
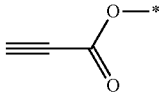

(P-17)
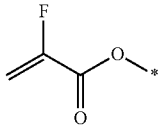

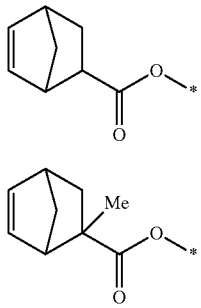

(P-18)

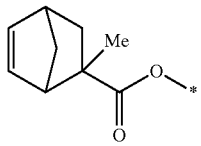

(P-19)

L₁ and L₂ each independently represent a single bond or a divalent linking group.

Examples of the divalent linking group include an ether group (—O—), a carbonyl group (—CO—), an ester group (—COO—), a thioether group (—S—), —SO₂—, —NR— (R represents a hydrogen atom or an alkyl group), a divalent hydrocarbon group (for example, a saturated hydrocarbon group such as an alkylene group; an alkenylene group (for example, —CH=CH—); an alkynylene group (for example, —C≡C—); and an arylene group), and a group of a combination of these groups.

Among the above-described divalent linking groups, an atom directly bonded to the benzene ring group in Formula (I) is preferably a carbon atom, and the carbon atom is preferably an sp3 carbon atom (carbon atom having only a single bond).

The divalent linking group is preferably a divalent hydrocarbon group having 1 to 20 carbon atoms, which may have a substituent. One or more methylene groups in the divalent hydrocarbon group may be each independently substituted with —O— or —C(=O)—. One methylene group may be substituted with —O— and the methylene group adjacent thereto may be substituted with —C(=O)— to form an ester group.

As the substituent which may be included in the divalent hydrocarbon group, for example, a fluorine atom is preferable.

The divalent hydrocarbon group has 1 to 20 carbon atoms, and preferably has 1 to 10 carbon atoms and more preferably has 1 to 5 carbon atoms.

The divalent hydrocarbon group may be linear or branched, may have a cyclic structure.

Among these, it is preferable that L₁ represents a group represented by Formula (A) and L₂ represents a group represented by Formula (B).

*—Z₁-Sp₁-**　　　　　　　　　　　　　　Formula (A)

*—Z₂-Sp₂-**　　　　　　　　　　　　　　Formula (B)

Z₁ and Z₂ each independently represent —C(R$_{za}$)(R$_{zb}$)—.

R$_{za}$ and R$_{zb}$ each independently represent a hydrogen atom or a substituent, and a hydrogen atom is preferable.

Sp₁ and Sp₂ each independently represent a divalent hydrocarbon group having 1 to 19 carbon atoms, which may have a fluorine atom, or a single bond. One or more methylene groups in the divalent hydrocarbon group may be each independently substituted with —O— or —C(=O)—. One methylene group may be substituted with —O— and the methylene group adjacent thereto may be substituted with —C(=O)— to form an ester group.

The divalent hydrocarbon group may be linear or branched, may have a cyclic structure.

Each of * represents a bonding position with the benzene ring group directly bonded to L₁ or L₂, and each of ** represents a bonding position with P₁ or P₂.

X represents —C(R$_{xa}$)(R$_{xb}$)—. R$_{xa}$ and R$_{xb}$ each independently represent a hydrogen atom or a substituent.

R$_{xa}$ and R$_{xb}$ are preferably hydrogen atoms.

Y represents —C(R$_{ya}$)(R$_{yb}$)—, —O—, —NR$_{yn}$—, or —S—. R$_{ya}$ and R$_{yb}$ each independently represent a hydrogen atom or a substituent. R$_{yn}$ represents a hydrogen atom or an alkyl group having 1 to 6 carbon atoms (the alkyl group may be linear or branched, and may have a cyclic structure; in addition, the alkyl group may further have a substituent).

Among these, Y is preferably —C(R$_{ya}$)(R$_{yb}$)— or —O—, and from the viewpoint that coloration of the compound can be more suppressed, is more preferably —C(R$_{ya}$)(R$_{yb}$)—.

R₁ to R₄ each independently represents a substituent.

It is preferable that the substituents are each independently an alkyl group having 1 to 20 carbon atoms (preferably 1 to 10 carbon atoms and more preferably 2 to 5 carbon atoms), an alkoxy group having 1 to 20 carbon atoms, an alkanoyl group having 1 to 20 carbon atoms, an alkanoyloxy group having 1 to 20 carbon atoms, an alkoxycarbonyl group having 1 to 20 carbon atoms (preferably 2 to 6 carbon atoms), an alkylamino group having 1 to 20 carbon atoms, an alkylaminocarbonyl group having 1 to 20 carbon atoms, an alkanoylamino group having 1 to 20 carbon atoms, a cyano group, a nitro group, a halogen atom, or group having a polymerizable group (examples of the polymerizable group include the groups exemplified in the description of P₁ and P₂).

In a case where the above-described substituent can be linear or branched, the above-described substituent may be linear or branched. In addition, if possible, the above-described substituent may have a cyclic structure.

One or more methylene groups in the alkyl group portion of the above-described alkyl group or the above-described substituent (for example, the portion other than —O— in the above-described alkoxy group) may be each independently substituted with —O— or —C(=O)—.

In addition, if possible, the above-described substituent may further have a substituent (preferably a fluorine atom). For example, it is also preferable that the above-described alkyl group is a fluoroalkyl group (for example, a perfluoroalkyl group having 1 to 10 carbon atoms, such as a trifluoromethyl group). In addition, for example, it is also preferable that the alkyl group portion of the above-described substituent has a fluorine atom.

Among these, from the viewpoint that liquid crystallinity and solubility of the compound are excellent, as the substituent, the above-described alkyl group, the above-described alkyloxycarbonyl group, or the above-described alkylaminocarbonyl group is preferable, and an alkyl group having 2 or more carbon atoms, a fluoromethyl group (preferably a trifluoromethyl group), the above-described alkyloxycarbonyl group, or the above-described alkylaminocarbonyl group is more preferable, and the above-described alkyloxycarbonyl group or the above-described alkylaminocarbonyl group is still more preferable, and the above-described alkyloxycarbonyl group is particularly preferable.

m₁ to m₄ each independently represent an integer of 0 to 4. In a case where R₁ to R₄ corresponding to a case where m₁ to m₄ are 2 or more are each present in plurality, R₁'s to R₄'s each may be the same or different from each other.

From the viewpoint that liquid crystallinity and solubility of the compound are excellent, it is preferable that at least one of $m_1$ to $m_4$ represents an integer of 1 or more. Among these, it is preferable that $m_3$ is an integer of 1 or more.

Among these, it is preferable that at least one of $m_1$ to $m_4$ represents an integer of 1 or more, and as at least one of $R_1$ to $R_4$ corresponding to the at least one of $m_1$ to $m_4$ representing an integer of 1 or more, the above-described alkyl group, the above-described alkyloxycarbonyl group, or the above-described alkylaminocarbonyl group is preferable, and an alkyl group having 2 or more carbon atoms, a fluoromethyl group (preferably a trifluoromethyl group), the above-described alkyloxycarbonyl group, or the above-described alkylaminocarbonyl group is more preferable, and the above-described alkyloxycarbonyl group or the above-described alkylaminocarbonyl group is still more preferable, and the above-described alkyloxycarbonyl group is particularly preferable. In particular, it is preferable that $m_3$ represents an integer of 1 or more and at least one of $R_3$ is the above-described alkyl group, the above-described alkyloxycarbonyl group, or the above-described alkylaminocarbonyl group.

Examples of the at least one of $R_1$ to $R_4$ corresponding to the at least one of $m_1$ to $m_4$ representing an integer of 1 or more include an aspect in which, in a case where $m_1$ represents an integer of 1 or more and $m_2$ to $m_4$ are 0, $R_1$ corresponding to $m_1$ is the above-described group. In addition, other examples thereof include an aspect in which, in a case where $m_1$ and $m_2$ represent an integer of 1 or more and $m_3$ and $m_4$ are 0, at least one of $R_1$ corresponding to $m_1$ and $R_2$ corresponding to $m_2$ is the above-described group.

The refractive index anisotropy Δn of the compound A is not particularly limited, but is preferably 0.23 or more, more preferably 0.28 or more, and still more preferably 0.30 or more. The upper limit is not particularly limited, but is usually 0.60 or less.

As a method for measuring Δn, a method using a wedge-shaped liquid crystal cell, which is described on page 202 of Liquid Crystal Handbook (edited by the Liquid Crystal Handbook Editorial Committee, published by MARUZEN CO., LTD.), is commonly used. In a case of a compound which is easily crystallized, it is also possible to evaluate with a mixture with other liquid crystals and estimate Δn from the extrapolated value thereof.

Δn corresponds to a measured value at a wavelength of 550 nm at 30° C.

Specific examples of the compound A include the following compounds A-1 to A-16.

A-1

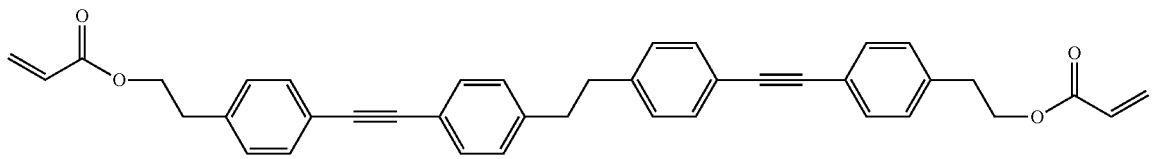

A-2

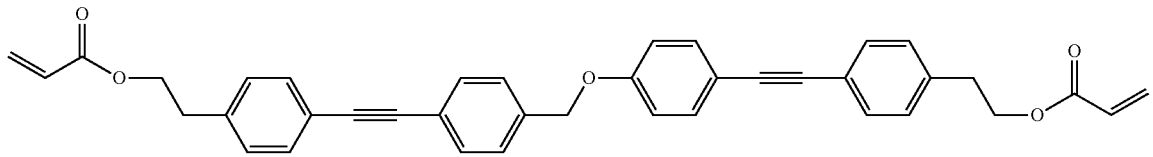

A-3

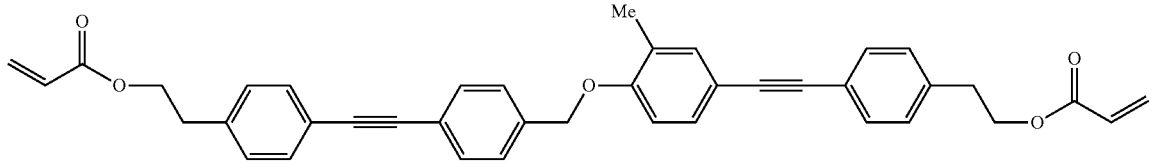

A-4

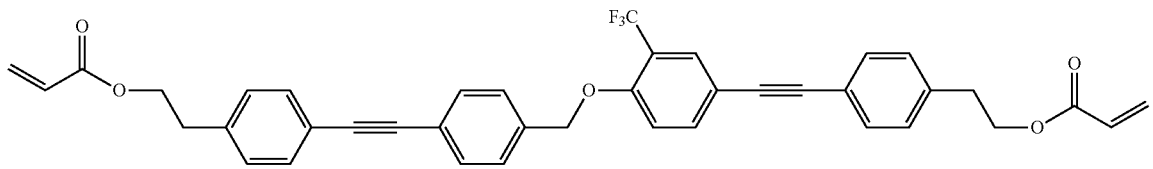

A-5

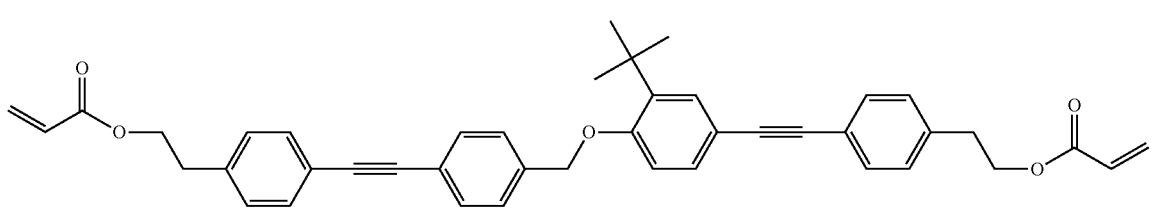

-continued
A-6
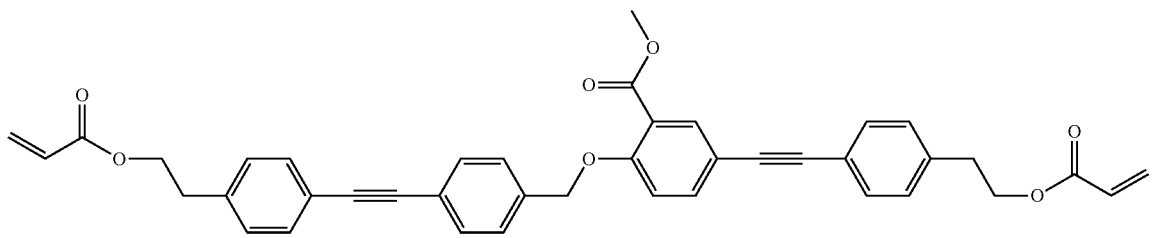
A-7
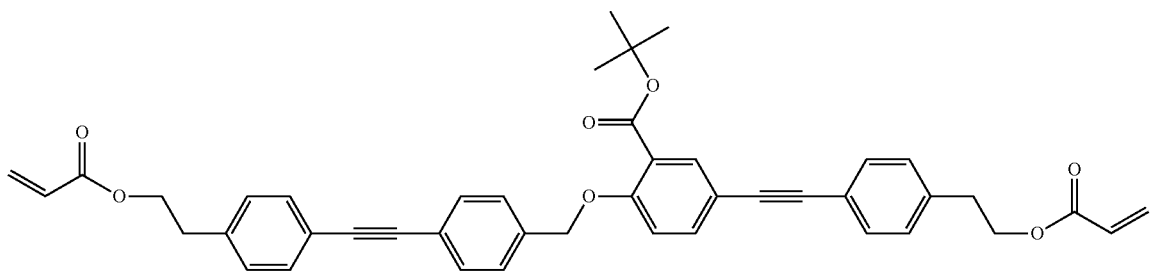
A-8
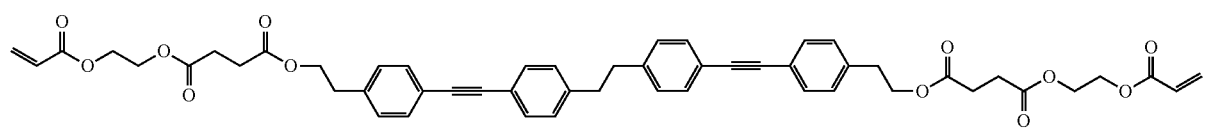
A-9
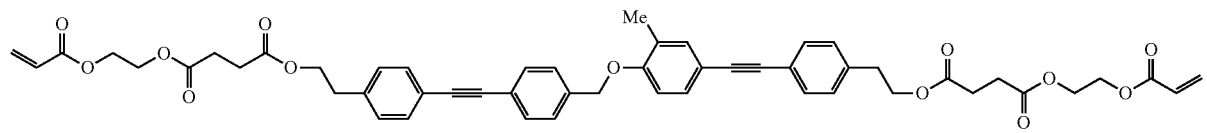
A-10
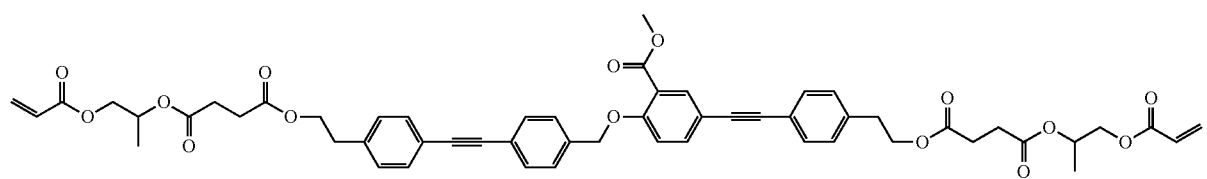
A-11
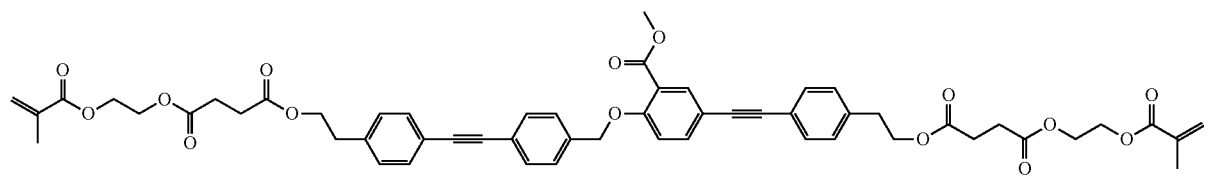
A-12
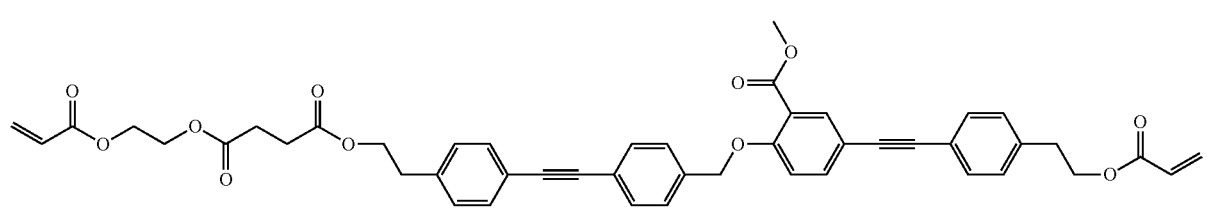

-continued
A-13
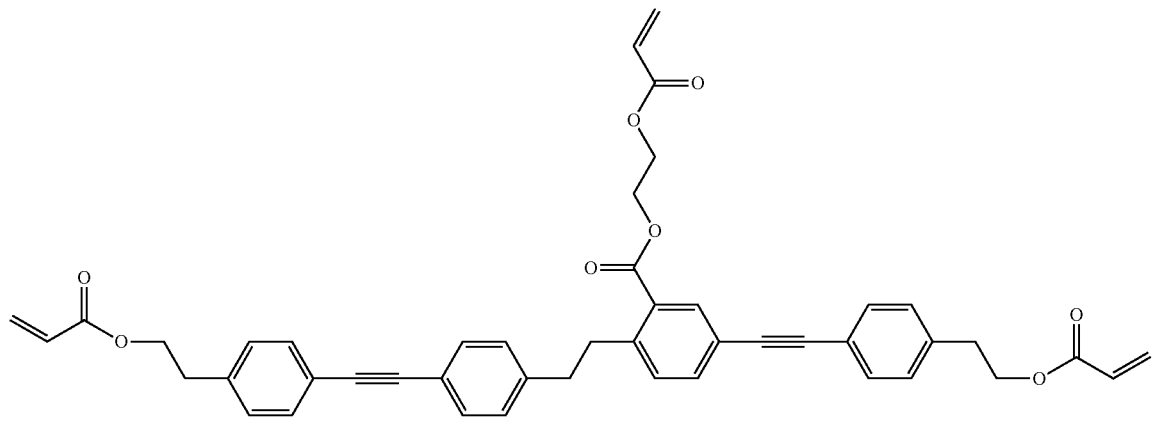
A-14
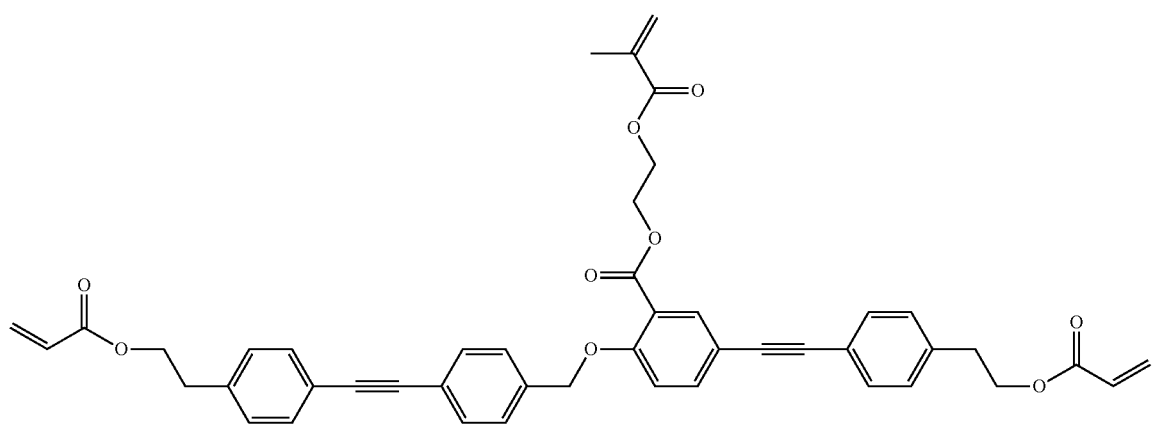
A-15
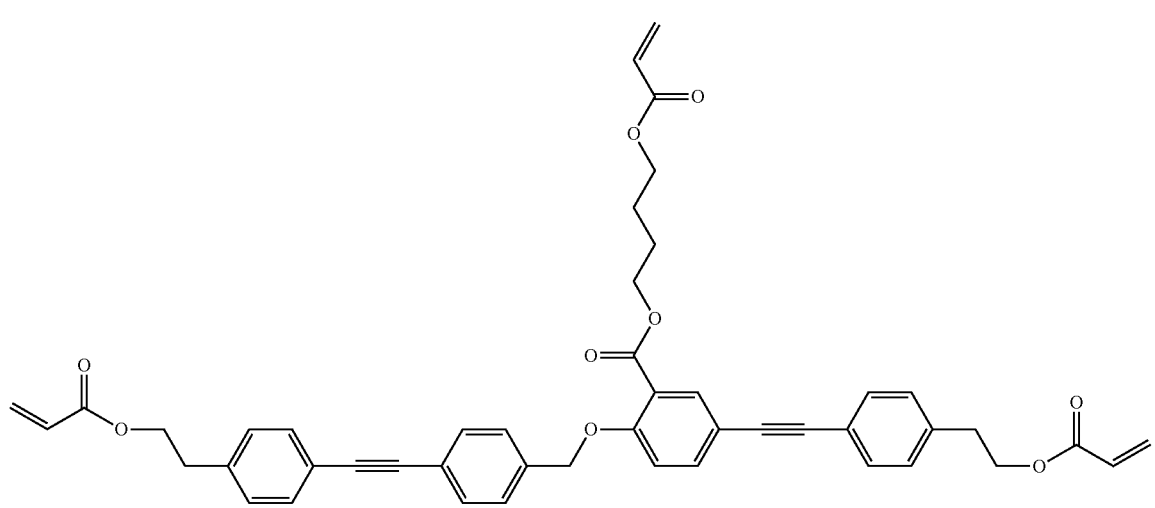
A-16
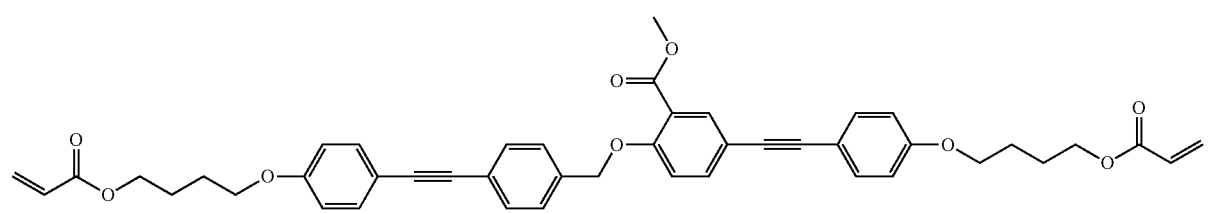

The composition may include components other than the compound A.

The content of the compound A in the composition is not particularly limited, but is preferably 20 to 100 mass % and more preferably 40 to 100 mass % with respect to the total mass of the solid content in the composition.

The solid content means components (nonvolatile components) other than a solvent in the composition. In a case where a component is not a solvent, the component is regarded as a solid content even in a case where the property of the component is liquid.

In the composition, one kind of the compound A may be used alone, or two or more kinds thereof may be used in combination. In a case where two or more kinds thereof are used in combination, the total content thereof is preferably within the above-described range.

Hereinafter, other components included in the composition will be described in detail.

<Other Liquid Crystal Compounds>

The composition may include other liquid crystal compounds other than the compound A.

The other liquid crystal compounds may be a rod-shaped liquid crystal compound or a disk-shaped liquid crystal compound, but is preferably a rod-shaped liquid crystal compound. In addition, the other liquid crystal compounds is preferably a liquid crystal compound having a polymerizable group (other polymerizable liquid crystal compounds).

Examples of the rod-shaped liquid crystal compound as the other liquid crystal compounds include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferable. Not only a low-molecular-weight liquid crystal compound but also a high-molecular-weight liquid crystal compound can be used.

The liquid crystal compound having a polymerizable group can be obtained by introducing a polymerizable group into the liquid crystal compound. Examples of the polymerizable group include the groups exemplified in $P_1$ and $P_2$ of Formula (I).

The number of polymerizable groups in the liquid crystal compound having a polymerizable group is preferably 1 to 6 and more preferably 1 to 3.

It is preferable that the other liquid crystal compounds have high refractive index anisotropy $\Delta n$, and specifically, the refractive index anisotropy $\Delta n$ is preferably 0.15 or more, more preferably 0.18 or more, and still more preferably 0.22 or more. The upper limit is not particularly limited, but is usually 0.60 or less.

In addition, by using the compound A mixed with the other liquid crystal compounds, the crystallization temperature as a whole can be significantly lowered.

Examples of the other liquid crystal compounds include compounds described in Makromol. Chem. (1989), Vol. 190, p. 2255, Advanced Materials (1993), Vol. 5, p. 107, U.S. Pat. Nos. 4,683,327A, 4,983,479A, 5,622,648A, 5,770,107A, WO1995/022586A, WO1995/024455A, WO1997/000600A, WO1998/023580A, WO1998/052905A, JP1989-272551A (JP-H01-272551A), JP1994-016616A (JP-H06-016616A), JP1995-110469A (JP-H07-110469A), JP1999-080081A (JP-H11-080081A), and JP2001-328973A.

In a case where the composition includes other liquid crystal compounds, the content of the other liquid crystal compounds in the composition is not particularly limited, but is preferably 10 to 200 mass % and more preferably 50 to 150 mass % with respect to the total mass of the compound A.

In the composition, one kind of the other liquid crystal compounds may be used alone, or two or more kinds thereof may be used in combination. In a case where two or more kinds thereof are used in combination, the total content thereof is preferably within the above-described range.

<Polymerization Initiator>

The composition may include a polymerization initiator.

It is preferable that the polymerization initiator is a photopolymerization initiator capable of initiating a polymerization reaction with ultraviolet irradiation. Examples of the photopolymerization initiator include an α-carbonyl compound, acyloin ether, an α-hydrocarbon-substituted aromatic acyloin compound, a polynuclear quinone compound, a phenazine compound, and an oxadiazole compound. In addition, a compound having an oxime ester structure is also preferable.

In a case where the composition includes a polymerization initiator, the content of the polymerization initiator in the composition is not particularly limited, but is preferably 0.1 to 20 mass % and more preferably 1 to 8 mass % with respect to the total mass of the compound A (in a case where the composition includes other polymerizable liquid crystal compounds, with respect to the total mass of the compound A and the other polymerizable liquid crystal compounds).

In the composition, one kind of the polymerization initiator may be used alone, or two or more kinds thereof may be used in combination. In a case where two or more kinds thereof are used in combination, the total content thereof is preferably within the above-described range.

<Surfactant>

The composition may include a surfactant which contributes to formation of a stable or rapid liquid crystalline phase (for example, nematic phase and cholesteric phase).

Examples of the surfactant include fluorine-containing (meth)acrylate-based polymers, compounds represented by Formulae (X1) to (X3) described in WO2011/162291A, compound represented by Formula (I) described in paragraphs 0082 to 0090 of JP2014-119605A, and compounds described in paragraphs 0020 to 0031 of JP2013-047204A. Regarding these compounds, in an air interface of layers, a tilt angle of the molecules of the liquid crystal compound can be reduced, or the liquid crystal compound can be substantially horizontally aligned.

In the present specification, "horizontal alignment" means that the molecular axis of the liquid crystal compound (in a case where the liquid crystal compound is a rod-shaped liquid crystal compound, corresponding to a long axis of the liquid crystal compound) and the film surface are parallel to each other, but it is not required to be strictly parallel. In the present specification, "horizontal alignment" means an alignment in which the tilt angle formed with the film surface is less than 20 degrees. In a case where the liquid crystal compound is horizontally aligned in a vicinity of the air interface, orientation defect hardly occurs, and as a result, transparency in the visible light region is high. On the other hand, in a case where the molecules of the liquid crystal compound are aligned at a large tilt angle, for example, in a case of cholesteric phase, since a spiral axis thereof deviates from a normal line of the film surface, reflectivity may decrease, fingerprint patterns may occur, or haze may increase or diffractivity may be exhibited, which are not preferable.

Examples of the fluorine-containing (meth)acrylate-based polymer which can be used as the surfactant include polymers described in paragraphs 0018 to 0043 of JP2007-272185A.

In a case where the composition includes a surfactant, the content of the surfactant is not particularly limited, but is preferably 0.001 to 10 mass % and more preferably 0.05 to 3 mass % with respect to the total mass of the compound A (in a case where the composition includes other liquid crystal compounds, with respect to the total mass of the present compound A and the other liquid crystal compounds).

In the composition, one kind of the surfactant may be used alone, or two or more kinds thereof may be used in combination. In a case where two or more kinds thereof are used in combination, the total content thereof is preferably within the above-described range.

<Chiral Agent>

The composition may include a chiral agent. In a case where the composition includes a chiral agent, a cholesteric phase can be formed.

The type of the chiral agent is not particularly limited. The chiral agent may be liquid crystalline or non-liquid crystalline. In general, the chiral agent includes an asymmetric carbon atom. However, an axially asymmetric compound or a surface asymmetric compound not having the asymmetric carbon atom can also be used as the chiral agent. Examples of the axially asymmetric compound or the surface asymmetric compound include binaphthyl, helicene, paracyclophane, and derivatives thereof. The chiral agent may include a polymerizable group.

In a case where the composition includes a chiral agent, the content of the chiral agent in the composition is not particularly limited, but is preferably 0.1 to 15 mass % and more preferably 1.0 to 10 mass % with respect to the total mass of the compound A (in a case where the composition includes other liquid crystal compounds, with respect to the total mass of the compound A and the other liquid crystal compounds).

In the composition, one kind of the chiral agent may be used alone, or two or more kinds thereof may be used in combination. In a case where two or more kinds thereof are used in combination, the total content thereof is preferably within the above-described range.

<Solvent>

The composition may include a solvent. It is preferable that the solvent can dissolve each component of the composition, and examples thereof include chloroform. In a case where the composition includes a solvent, the content of the solvent in the composition is preferably an amount in which the concentration of solid contents in the composition is 0.5 to 20 mass %, and more preferably an amount in which the concentration of solid contents in the composition is 1 to 10 mass %.

In the composition, one kind of the solvent may be used alone, or two or more kinds thereof may be used in combination. In a case where two or more kinds thereof are used in combination, the total content thereof is preferably within the above-described range.

In addition to the above-described additives, the composition may include other additives such as an antioxidant, an ultraviolet absorber, a sensitizer, a stabilizer, a plasticizer, a chain transfer agent, a polymerization inhibitor, an anti-foaming agent, a leveling agent, a thickener, a flame retardant, a surfactant, a dispersant, and a colorant such as a dye and a pigment.

In addition, it is also preferable that the optically-anisotropic layer can be made to have a substantially wide range for the wavelength of incidence light by imparting a torsion component to the composition or by laminating different phase difference layers. For example, in the optically-anisotropic layer, a method of realizing a $\lambda/2$ plate having a wide-range pattern by laminating two liquid crystal layers having different twisted directions is disclosed in, for example, JP2014-089476A and can be preferably used in the optical element according to the embodiment of the present disclosure.

<Curing Method>

A method for curing (polymerizing and curing) the above-described composition is not particularly limited, and a known method can be adopted. Examples thereof include an aspect having a step X in which a predetermined substrate is brought into contact with the composition to form a composition layer on the substrate, and a step Y in which the composition layer is subjected to a heating treatment to align the compound A, and then a curing treatment is performed. According to this aspect, the compound A can be immobilized in an aligned state, and an optically-anisotropic layer can be formed.

Hereinafter, the procedures of the step X and the step Y will be described in detail.

The step X is a step in which a predetermined substrate is brought into contact with the composition to form a composition layer on the substrate. The type of the substrate used is not particularly limited, and examples thereof include a known substrate (for example, a resin substrate, a glass substrate, a ceramic substrate, a semiconductor substrate, and a metal substrate).

The method of bringing the substrate into contact with the composition is not particularly limited, and examples thereof include a method of applying the composition on the substrate and a method of immersing the substrate in the composition.

After contacting substrate with the composition, as necessary, a drying treatment may be performed in other to remove a solvent from the composition layer on the substrate.

The step Y is a step in which the composition layer is subjected to a heating treatment to align the compound A, and then a curing treatment is performed.

By subjecting the composition layer to a heating treatment, the compound A is aligned and a liquid crystalline phase is formed. For example, in a case where the composition layer includes the chiral agent, a cholesteric liquid crystalline phase is formed.

The conditions of the heating treatment are not particularly limited, and the optimum conditions are selected depending on the type of the compound A.

The method of curing treatment is not particularly limited, and examples thereof include photo-curing treatment and thermosetting treatment. Among these, a light irradiation treatment is preferable and an ultraviolet irradiation treatment is more preferable.

A light source such as an ultraviolet lamp is used for the ultraviolet irradiation.

The cured product obtained by the above-described treatment corresponds to a layer in which the liquid crystalline phase is immobilized. In particular, in a case where the composition includes the chiral agent, a layer having an immobilized cholesteric liquid crystalline phase is formed.

It should be noted that these layers no longer need to exhibit liquid crystallinity. More specifically, for example, in the state of the "immobilized" cholesteric liquid crystalline phase, a state in which the alignment of the compound A as the cholesteric liquid crystalline phase is maintained is the most typical and preferred aspect. More specifically, it is preferable that, in a temperature range of 0° C. to 50° C. and under more severe conditions in a temperature range of −30° C. to 70° C., a state in which the layer has no fluidity and the immobilized alignment form can be maintained stably without causing a change in alignment form due to an external field or an external force is preferable.

Next, other components of the optical element 10 will be described.

<<Support>>

The support 20 supports the alignment film 24 and the optically-anisotropic layer 26.

As the support 20, various sheet-shaped materials (films or plate-shaped materials) can be used as long as the support can support the alignment film and the optically-anisotropic layer.

As the support 20, a transparent support is preferable, and examples thereof include a polyacrylic resin film such as polymethyl methacrylate, a cellulose resin film such as cellulose triacetate, a cycloolefin polymer film (for example, trade name "ARTON", manufactured by JSR Corporation; or trade name "ZEONOR", manufactured by Zeon Corporation), polyethylene terephthalate (PET), polycarbonate, and polyvinyl chloride. The support is not limited to a flexible film and may be a non-flexible substrate such as a glass substrate.

The thickness of the support 20 is not particularly limited and may be appropriately set depending on the use of the optical element 10, a material for forming the support 20, and the like in a range where the alignment film and the optically-anisotropic layer can be supported.

The thickness of the support 20 is preferably 1 to 1000 µm, more preferably 3 to 250 µm, and still more preferably 5 to 150 µm.

<<Alignment Film>>

In the optical element 10, the alignment film 24 is formed on a surface of the support 20.

The alignment film 24 is an alignment film for aligning the liquid crystal compound 30 to a predetermined liquid crystal alignment pattern during the formation of the optically-anisotropic layer 26. As derived above, in the optical element 10, the optically-anisotropic layer has a liquid crystal alignment pattern in which a direction of an optical axis 30A (refer to FIG. 2) derived from the liquid crystal compound 30 changes while continuously rotating in one in-plane direction (x direction). Accordingly, the alignment film is formed such that the optically-anisotropic layer can form this liquid crystal alignment pattern.

As the alignment film, various known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as w-tricosanoic acid, dioctadecylmethylammonium chloride, or methyl stearate.

The alignment film formed by a rubbing treatment can be formed by rubbing a surface of a polymer layer with paper or fabric in a given direction multiple times.

Preferred examples of the material used for the alignment film include a material for forming polyimide, polyvinyl alcohol, a polymer having a polymerizable group described in JP1997-152509A (JP-H09-152509A), and an alignment film described in JP2005-097377A, JP2005-099228A, and JP2005-128503A.

In the optical element 10, for example, the alignment film can be suitably used as a so-called photo-alignment film obtained by irradiating a photo-alignable material with polarized light or non-polarized light. That is, in the optical element 10, a photo-alignment film that is formed by applying a photo-alignable material to the support 20 is suitably used as the alignment film.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the photo-alignment film include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide-and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking ester described in JP2003-520878A, JP2004-529220A, and JP4162850B; and a photodimerizable compound, in particular, a cinnamate compound, a chalcone compound, or a coumarin compound described in JP1997-118717A (JP-H09-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking ester, a cinnamate compound, or a chalcone compound is suitability used.

The thickness of the alignment film is not particularly limited. The thickness with which a required alignment function can be obtained may be appropriately set depending on the material for forming the alignment film.

The thickness of the alignment film is preferably 0.01 to 5 µm and more preferably 0.05 to 2 µm.

A method for forming the alignment film is not limited, and various known methods can be used depending on the material for forming the alignment film. Examples thereof include a method including: applying the alignment film to a surface of the support 20; drying the applied alignment film; and exposing the alignment film to laser light to form an alignment pattern.

Figure 5:
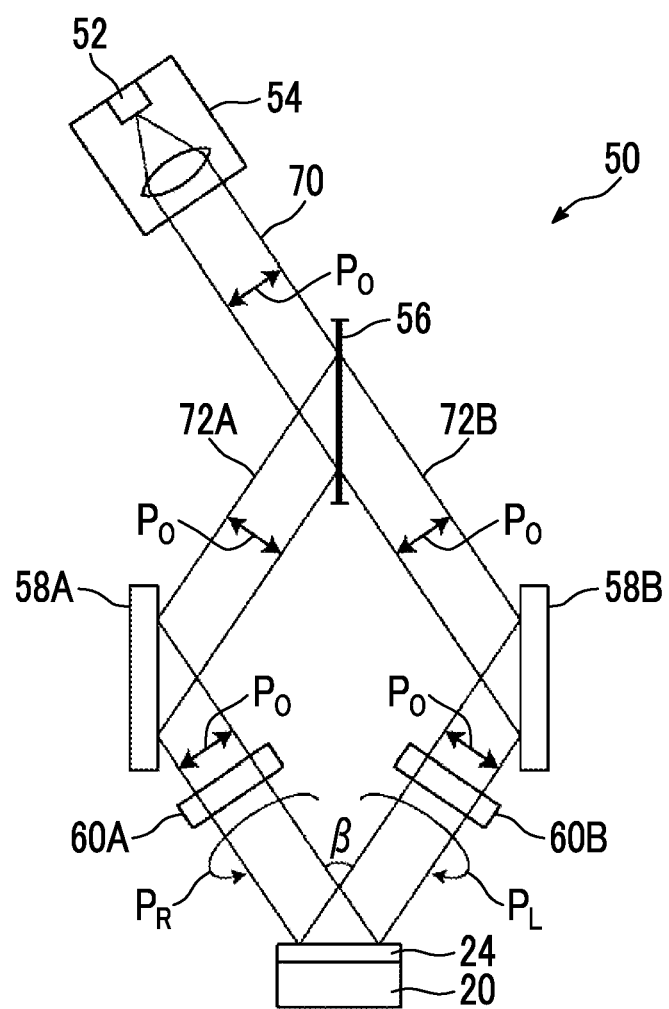
FIG. 5 is a diagram illustrating a schematic configuration of an exposure device which irradiates an alignment film with interference light.

FIG. 5 conceptually shows an example of an exposure device that exposes the alignment film to form an alignment pattern. In the example shown in FIG. 5, the exposure of the alignment film 24 of the first optical element 10 is shown as an example.

An exposure device 50 shown in FIG. 5 includes: a light source 54 including a laser 52; a beam splitter 56 which splits a laser light 70 emitted from the laser 52 into two beams 72A and 72B; mirrors 58A and 58B which are disposed on optical paths of the splitted two beams 72A and 72B; and λ/4 plates 60A and 60B.

The light source 64 emits linearly polarized light $P_0$. The λ/4 plates 60A and 60B have optical axes perpendicular to each other. The λ/4 plate 60A converts the linearly polarized light $P_0$ (beam 72A) into right circularly polarized light $P_R$, and the λ/4 plate 60B converts the linearly polarized light $P_0$ (beam 72B) into left circularly polarized light $P_L$.

The support 20 including the alignment film 24 on which the alignment pattern is not yet formed is disposed at an exposed portion, the two beams 72A and 72B intersect and interfere each other on the alignment film 24, and the alignment film 24 is irradiated with and exposed to the interference light.

Due to the interference at this time, the polarization state of light with which the alignment film 24 is irradiated periodically changes according to interference fringes. As a result, in the alignment film 24, an alignment pattern in which the alignment state periodically changes can be obtained.

In the exposure device 50, by changing an intersection angle β between the two beams 72A and 72B, the period of the alignment pattern can be adjusted. That is, by adjusting the intersection angle β in the exposure device 50, in the alignment pattern in which the optical axis 30A derived from the liquid crystal compound 30 continuously rotates in the one direction, the length of single period (single period Λ) over which the optical axis 30A rotates 180° in the one direction that the optical axis 30A rotates can be adjusted.

By forming the optically-anisotropic layer on the alignment film having the alignment pattern in which the alignment state periodically changes, as described below, the optically-anisotropic layer 26 having the liquid crystal alignment pattern in which the optical axis 30A derived from the liquid crystal compound 30 continuously rotates in the one direction can be formed.

In addition, by rotating the optical axes of the λ/4 plates 60A and 60B by 90°, respectively, the rotation direction of the optical axis 30A can be reversed.

In the optical element according to the embodiment of the present disclosure, the alignment film is provided as a preferred aspect and is not an essential component.

For example, the following configuration can also be adopted, in which, by forming the alignment pattern on the support 20 using a method of rubbing the support 20, a method of processing the support 20 with laser light or the like, or the like, the optically-anisotropic layer 26 has the liquid crystal alignment pattern in which the direction of the optical axis 30A derived from the liquid crystal compound 30 changes while continuously in at least one in-plane direction.

[Other Aspects of Optical Element]

Figure 6:
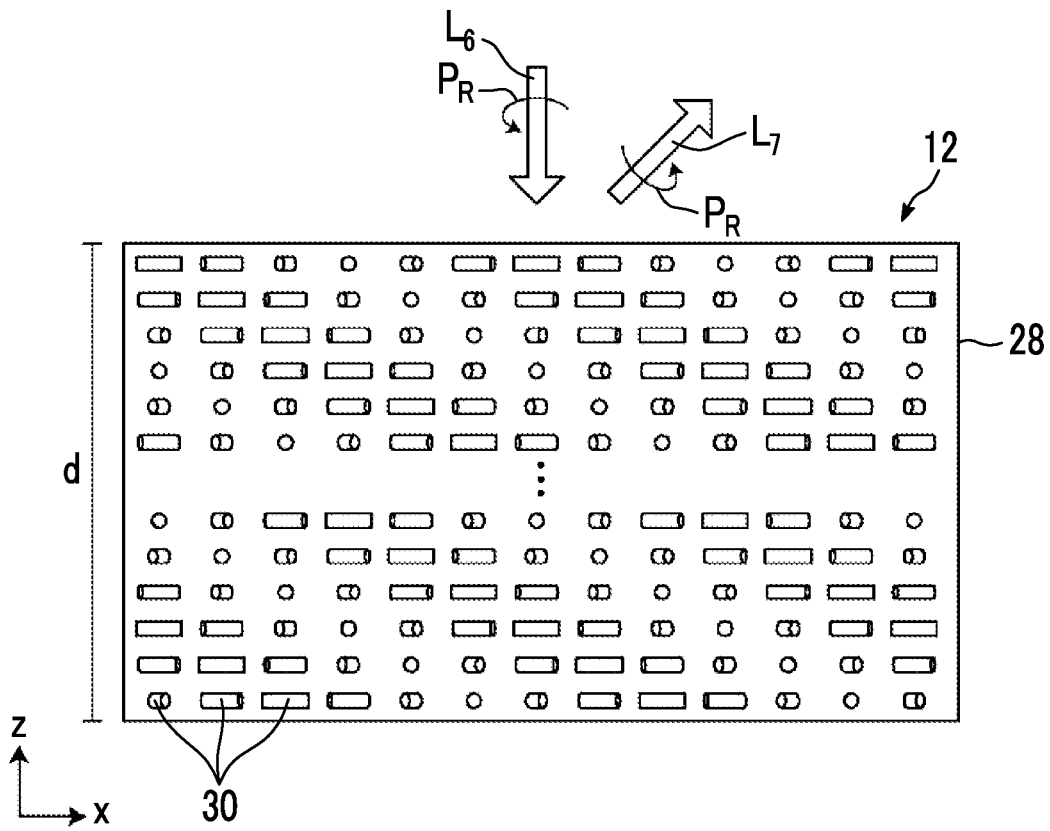
FIG. 6 is a view schematically showing another embodiment of the optical element according to the present invention.

FIG. 6 is a side view schematically showing another embodiment of an optical element 12 according to the present invention.

The optical element 12 include, as the first optically-anisotropic layer, an optically-anisotropic layer 28 in which the liquid crystal compound 30 is cholesterically aligned in the thickness direction. The optical element 12 shown in FIG. 6 may also have a configuration in which the liquid optically-anisotropic layer 28 is provided on an alignment film formed on a support.

It is known that the cholesteric liquid crystalline phase exhibits selective reflection properties at a specific wavelength. The center wavelength λ of selective reflection (selective reflection center wavelength λ) depends on a pitch P (=helical period) of a helical structure in the cholesteric liquid crystalline phase and satisfies a relationship of $\lambda = n \times P$ with an average refractive index n of the cholesteric liquid crystalline phase. Therefore, the selective reflection center wavelength can be adjusted by adjusting the pitch of the helical structure.

The cholesteric liquid crystalline phase exhibits selective reflection properties with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

In addition, a half-width Δλ (nm) of a selective reflection range (circularly polarized light reflection range) where selective reflection is exhibited depends on Δn of the cholesteric liquid crystalline phase and the helical pitch P and complies with a relationship of $\Delta\lambda = \Delta n \times P$. Therefore, the width of the selective reflection range can be controlled by adjusting Δn.

That is, the optically-anisotropic layer 28 exhibits a function of selectively reflecting light in a predetermined wavelength range in specific circularly polarized light (right circularly polarized light or left circularly polarized light).

On the other hand, since the alignment pattern of the optical axis 30A in the in-plane direction of the optical element 12 is the same as the alignment pattern of the optical element 10 shown in FIG. 2, the same effects as those of the optical element 10 are exhibited. That is, same as in the optical element 10 described above, the optical element 12 exhibits an action of bending incidence light to a predetermined direction by changing an absolute phase of the incidence light. Therefore, the optical element 12 has both the action of bending the incidence light to a direction different from the incidence direction and the action of the above-described cholesteric alignment, and reflects light at an angle in a predetermined direction with respect to the reflection direction of specular reflection.

For example, the optically-anisotropic layer 28 is designed such that the cholesteric liquid crystalline phase of the optically-anisotropic layer 28 reflects right circularly polarized light. In this case, as shown in FIG. 6, in a case where light $L_6$ which is right circularly polarized light $P_R$ is vertically incident into the main plane of the optically-anisotropic layer 28 of the optical element 12, that is, along the normal line, reflected light $L_7$ which travels in a direction having a tilt with respect to the normal direction is generated. That is, the optical element 12 functions as a reflective type diffraction grating.

Even in the optical element 12 having this configuration, which has 0.24 or more of a refractive index anisotropy Δn of the optically-anisotropic layer, compared with a case where an optically-anisotropic layer having a refractive index anisotropy Δn of less than 0.24 used, good diffraction efficiency can be obtained even at a large diffraction angle, for example, a diffraction angle of 30° or more.

In the optical elements shown in FIGS. 1 to 4 and 6, the optical axis 30A of the liquid crystal compound 30 in the liquid crystal alignment pattern of the optically-anisotropic layer continuously rotates only in the x direction in the plane.

However, the optical element according to the embodiment of the present disclosure is not limited thereto, and various configurations can be used as long as the optical axis 30A of the liquid crystal compound 30 in the optically-anisotropic layer continuously rotates in the one direction.

Figure 7:
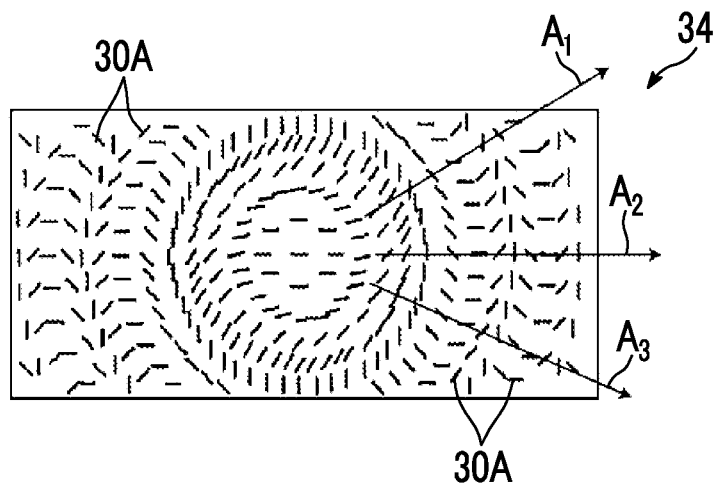
FIG. 7 is a schematic plan view of still another embodiment of the optical element according to the present invention.

FIG. 7 is a schematic plan view of an optically-anisotropic layer 34 in a design modification example of the optical element. In FIG. 7, the liquid crystal alignment pattern is shown by the optical axis 30A of the liquid crystal compound. The optically-anisotropic layer 34 has a liquid crystal alignment pattern that regions in which the optical axes 30A have the same alignment are provided concentrically, and that the one direction of the optical axes 30A, which changes while continuously rotating, is provided radially from the center of the optically-anisotropic layer 34.

In the optically-anisotropic layer 34, the direction of the optical axes 30A changes while continuously rotating in a direction in which a large number of optical axes move to the outside from the center of the optically-anisotropic layer 34, for example, a direction indicated by an arrow $A_1$, a direction indicated by an arrow $A_2$, a direction indicated by an arrow $A_3$, and the like.

In circularly polarized light incident into the optically-anisotropic layer 34 having the above-described liquid crystal alignment pattern, the absolute phase changes depending on individual local regions having different directions of optical axes of the liquid crystal compound 30. At this time, the amount of change in absolute phase varies depending on the directions of the optical axes of the liquid crystal compound 30 into which circularly polarized light is incident.

This way, in the optically-anisotropic layer 34 having the concentric circular liquid crystal alignment pattern, that is, the liquid crystal alignment pattern in which the optical axis changes while continuously rotating in a radial shape, transmission of incidence light can be allowed as diverging light or converging light depending on the rotation direction of the optical axis of the liquid crystal compound 30 and the direction of circularly polarized light to be incident.

That is, by setting the liquid crystal alignment pattern of the optically-anisotropic layer in a concentric circular shape, the optical element exhibits, for example, a function as a convex lens or a concave lens.

Here, in a case where the liquid crystal alignment pattern of the optically-anisotropic layer is concentric circular such that the optical element functions as a convex lens, it is preferable that the length of the single period Λ over which the optical axis rotates 180° in the liquid crystal alignment pattern gradually decreases from the center of the optically-anisotropic layer 34 toward the outer direction of the one direction in which the optical axis continuously rotates.

As described above, the refraction angle of light with respect to an incidence direction increases as the length of the single period Λ in the liquid crystal alignment pattern decreases. Accordingly, the length of the single period Λ in the liquid crystal alignment pattern gradually decreases from the center of the optically-anisotropic layer 34 toward the outer direction of the one direction in which the optical axis continuously rotates. As a result, the light gathering power of the optically-anisotropic layer 34 can be improved, and the performance as a convex lens can be improved.

In addition, depending on the uses of the optical element such as a concave lens, it is preferable that the length of the single period Λ over which the optical axis rotates 180° in the liquid crystal alignment pattern gradually decreases from the center of the optically-anisotropic layer 34 toward the outer direction of the one direction by reversing the direction in which the optical axis continuously rotates.

As described above, the refraction angle of light with respect to an incidence direction increases as the length of the single period Λ in the liquid crystal alignment pattern decreases. Accordingly, the length of the single period Λ in the liquid crystal alignment pattern gradually decreases from the center of the optically-anisotropic layer 34 toward the outer direction of the one direction in which the optical axis continuously rotates. As a result, the light diverging power of the optically-anisotropic layer 34 can be improved, and the performance as a concave lens can be improved.

For example, in a case where the optical element is used as a concave lens, it is also preferable that the turning direction of incident circularly polarized light is reversed.

Conversely, the length of the single period Λ in the concentric circular liquid crystal alignment pattern may gradually increase from the center of the optically-anisotropic layer 34 toward the outer direction of the one direction in which the optical axis continuously rotates.

Furthermore, depending on the uses of the optical element such as a case where it is desired to provide a light amount distribution in the transmitted light, a configuration in which regions having partially different lengths of the single periods Λ in the one direction in which the optical axis continuously rotates are provided can also be used instead of the configuration in which the length of the single period Λ gradually changes in the one direction in which the optical axis continuously rotates.

Furthermore, the optical element according to the embodiment of the present disclosure may include: an optically-anisotropic layer in which the single period Λ is uniform over the entire surface; and an optically-anisotropic layer in which regions having different lengths of the single periods Λ are provided.

In this way, the configuration of changing the length of the single period Λ over which the optical axis rotates 180° in the one direction in which the optical axis continuously rotates can also be used in the configuration shown in FIGS. 1 to 5 in which the optical axis 30A of the liquid crystal compound 30 continuously rotates only in the one direction of the x direction.

For example, by gradually decreasing the single period Λ of the liquid crystal alignment pattern in the x direction, an optical element which transmits light so as to be gathered can be obtained. In addition, by reversing the direction over which the optical axis in the liquid crystal alignment pattern rotates 180°, an optical element which transmits light so as to be diffused only in the x direction can be obtained. By reversing the turning direction of incident circularly polarized light, an optical element which allows transmission of light to be diffused only in the X direction can be obtained.

Furthermore, depending on the uses of the optical element such as a case where it is desired to provide a light amount distribution in the transmitted light, a configuration in which regions having partially different lengths of the single periods Λ in the x direction are provided can also be used instead of the configuration in which the length of the single period Λ gradually changes in the x direction.

[Method for Forming Photo-Alignment Pattern]

One embodiment of the "method for forming a photo-alignment pattern" according to the present invention is a method including: arranging, as a birefringent mask, the optical element according to the embodiment of the present invention to face a photo-alignment film; and irradiating the photo-alignment film with light through the birefringent mask to form, on a surface of the photo-alignment film, a photo-alignment pattern corresponding to the first liquid crystal alignment pattern of the optical element.

Figure 8:
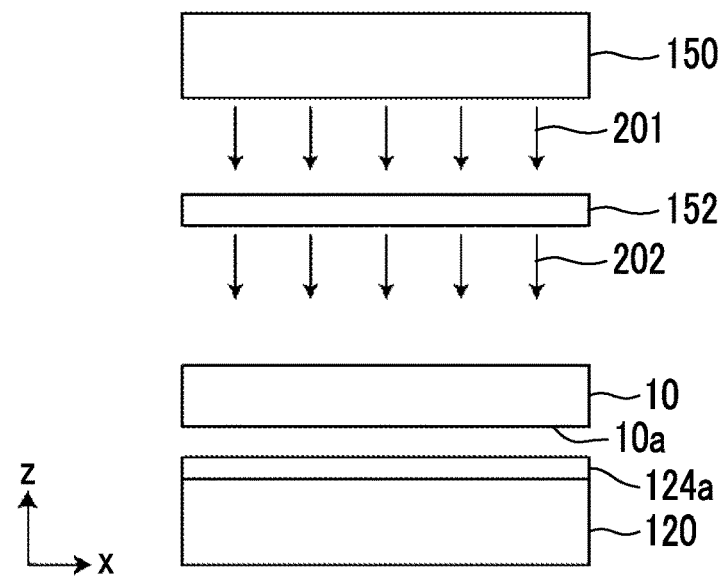
FIG. 8 is a conceptual diagram for explaining a method for forming a photo-alignment pattern according to the present invention.
Figure 9:
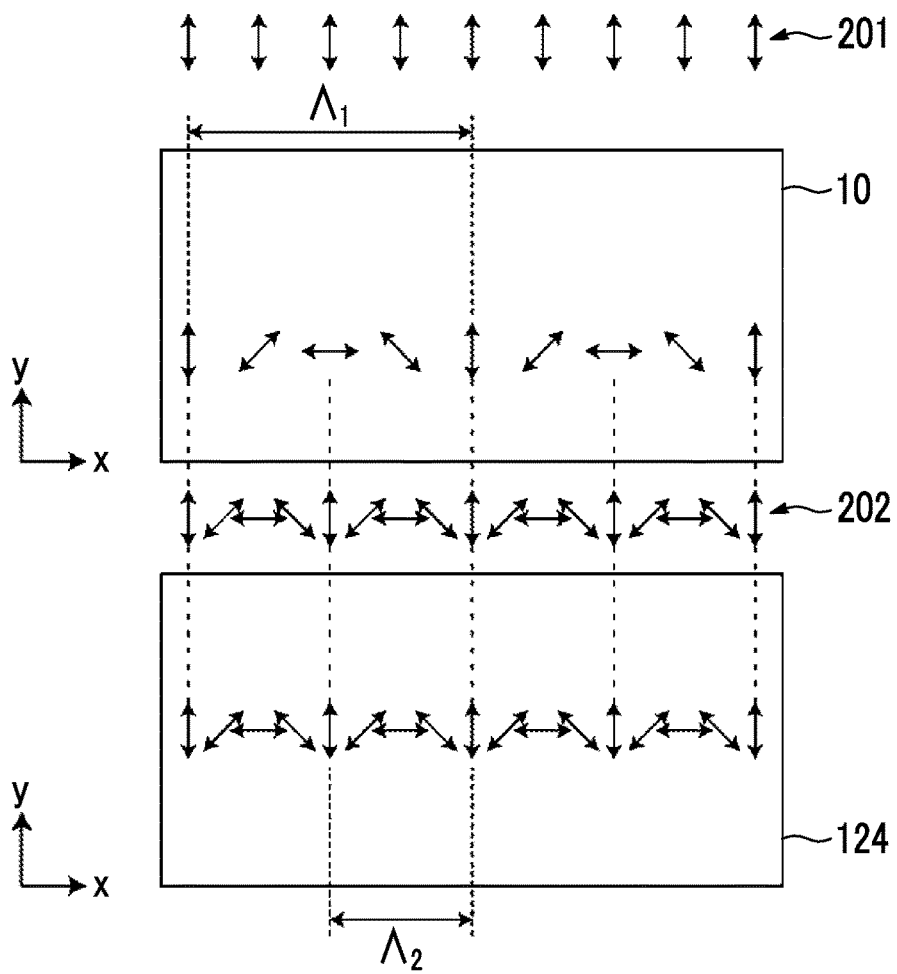
FIG. 9 is a diagram for explaining the photo-alignment pattern formed in the method for forming a photo-alignment pattern according to the present invention.

FIG. 8 is a diagram showing an embodiment of the method for forming a photo-alignment pattern using the above-described optical element, and FIG. 9 is a schematic diagram for explaining a polarization pattern of irradiation light in a case of forming the photo-alignment pattern. Here, the optical element 10 described above is used as a birefringent mask. The optical element 10 is arranged such that a surface of a photo-alignment film 124 provided on a support 120 and a surface 10a of the optical element 10 on the optically-anisotropic layer side face each other. By outputting a parallel light 201 from a light source device 150 and transmitting this parallel light 201 through a linear polarizer 152, the parallel light 201 is converted into a linearly polarized light 202 and this linearly polarized light 202 is irradiated to the photo-alignment film 124 through the optical element 10.

The light source device 150 can be configured by, for example, a combination of an ultraviolet source such as a high-pressure mercury lamp and a parallel louver for converting light emitted from the source into parallel light.

FIG. 9 schematically shows the optical axes in the plane of the optical element 10 and the photo-alignment film 124, and a change in transmission axis orientation of linearly polarized light before and after being incident into the optical element 10.

Since the polarization axis of the light transmitted through the linear polarizer 152 is along the transmission axis orientation of the linear polarizer 152, the direction of the polarization axis of linearly polarized light before being incident into the optical element 10 is uniform. The direction of the polarization axis at the time of emission changes depending on the direction of the optical axis of the liquid crystal compound in the region of the optical element 10 through which the linearly polarized light passes. The polarization axis does not change at a point where the polarization axis at the time of incidence matches the direction of the optical axis of the liquid crystal compound, the polarization axis at the time of emission is perpendicular to the polarization axis at the time of incidence at a point where an angle between the polarization axis and the optical axis is 45°, and the like. A period $\Lambda_2$ of rotation of 180° in the x direction of the polarization axis of linearly polarized light passing through the optical element 10 is half of one period $\Lambda_1$ of the first liquid crystal alignment pattern of the optical element 10. The photo-alignment film 124 is irradiated with light having a pattern in which the polarization axis rotates in the x-axis direction in the period $\Lambda_2$. As a result, on the photo-alignment film 124, a photo-alignment pattern corresponding to the first liquid crystal alignment pattern, specifically, a photo-alignment pattern having the period $\Lambda_2=\Lambda_1/2$, which is ½ of the period $\Lambda_1$ of the first liquid crystal alignment pattern, is formed.

Since the optical element 10 has a large refractive index anisotropy $\Delta n$ of the optically-anisotropic layer 26, $\lambda/2$ in-plane retardation can be realized with a thin film thickness. As the optically-anisotropic layer 26 is thinner, it is possible to improve formation accuracy of a photo-alignment pattern in a case of being used as a mask.

[Method for Manufacturing Optical Element]

One embodiment of the method for manufacturing an optical element according to the present invention is characterized by using the above-described method for forming a photo-alignment pattern.

In addition, another embodiment of the method for manufacturing an optical element according to the present invention is a method for manufacturing an optical element, the method including: forming a photo-alignment film on one surface of a support, arranging, as a birefringent mask, the optical element according to the embodiment of the present invention to face the photo-alignment film, and irradiating the photo-alignment film with light through the birefringent mask to form, on a surface of the photo-alignment film, a photo-alignment pattern corresponding to the first liquid crystal alignment pattern of the optical element, and coating the surface of the photo-alignment film, on which the photo-alignment pattern has been formed, with a composition including a second liquid crystal compound and curing the composition to form the second optically-anisotropic layer consisting of a cured layer of the composition and having a second liquid crystal alignment pattern corresponding to the photo-alignment pattern, thereby manufacturing an optical element having a second optically-anisotropic layer.

In the above-described method for manufacturing an optical element, the compound represented by Formula (I), which is used as the first liquid crystal compound, can be used as the second liquid crystal compound. In this case, the new optical element manufactured in the method for manufacturing an optical element is an optical element having an optically-anisotropic layer consisting of a cured layer of a composition including the compound represented by Formula (I).

That is, the "method for manufacturing an optical element" according to the embodiment of the present invention can be applied to a manufacturing of the "optical element" according to the embodiment of the present invention by using the "optical element" according to the embodiment of the present invention.

Figure 10:
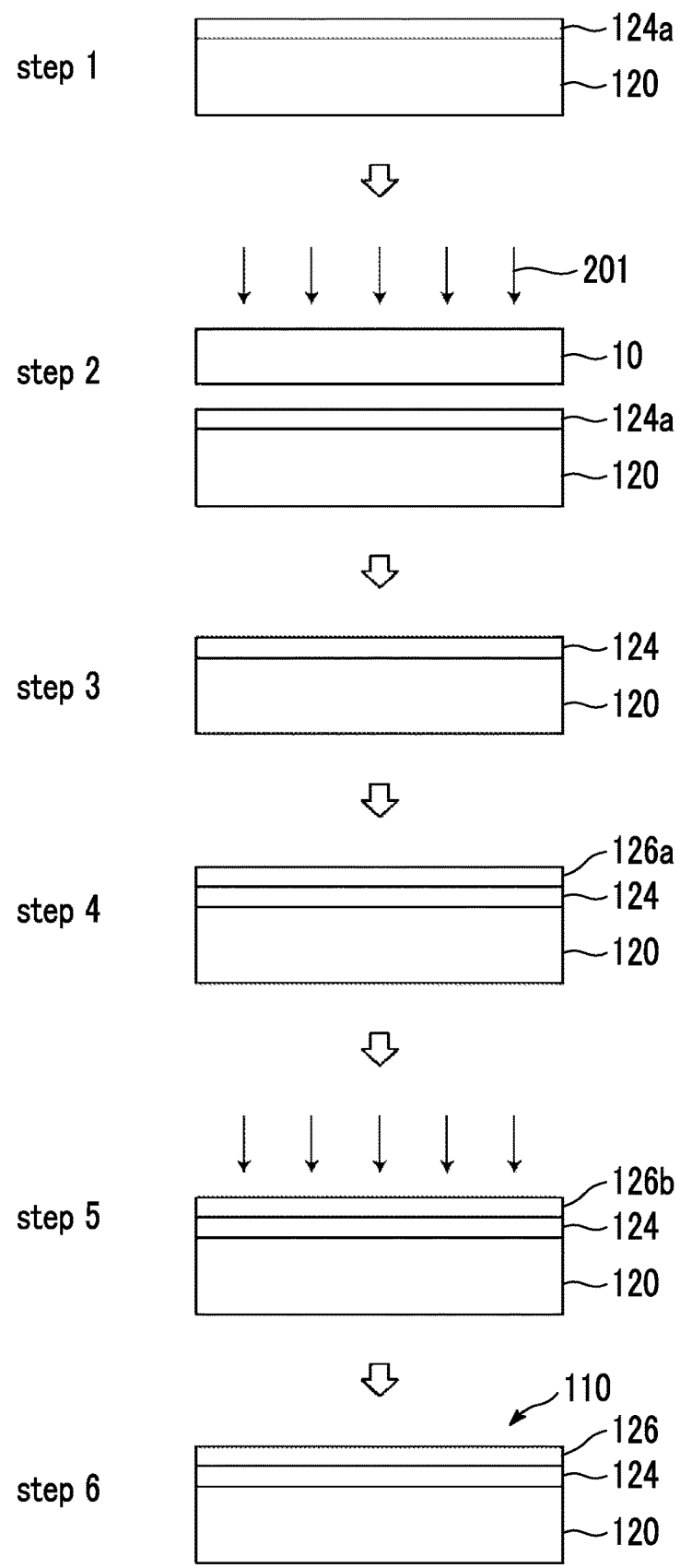
FIG. 10 is a diagram showing steps of an embodiment of a method for manufacturing an optical element according to the present invention.

FIG. 10 is a diagram showing steps of an embodiment of the "method for manufacturing an optical element" according to the present invention. An embodiment of a method for manufacturing an optical element will be described with reference to FIG. 10.

First, an alignment film 124a is applied and formed on a support 120 (step 1). Next, as described in the above-described method for forming a photo-alignment pattern, the optical element 10 is arranged such that a surface of the alignment film 124a and an optically-anisotropic layer of the optical element 10 face each other. The optically-anisotropic layer of the optical element 10 may be in contact with the alignment film 124a, or may be separated by a predetermined distance. However, it is preferable that the distance is short, and it is particularly preferable that the two are brought into contact with each other. The parallel light 201 of linearly polarized light is irradiated to the alignment film 124a through the optical element 10 (step 2). This step is a step of forming a photo-alignment pattern on the photo-alignment film, which is described with reference to FIGS. 8 and 9. Here, a photo-alignment pattern having the period $\Lambda_2$, which is ½ of the period $\Lambda_1$ of the first liquid crystal alignment pattern of the first optically-anisotropic layer in the optical element 10, is formed on the alignment film 124 to be a patterned photo-alignment film 124 (step 3).

Next, a composition including the second liquid crystal compound is applied to a surface of the patterned photo-alignment film 124 to form a composition layer 126a (step 4), and the composition layer 126a is cured by ultraviolet irradiation or the like to be a cured layer 126b (step 5). The above-described step X and step Y for forming a composition layer can be adopted for the step 4 and step 5. The coating and curing of the composition layer 126a are repeated a plurality of times to obtain a second optically-anisotropic layer 126 consisting of a cured layer having a desired thickness (step 6). By the heating treatment for aligning the liquid crystal compound in the step Y, the liquid crystal compound in the composition is aligned to the second liquid crystal alignment pattern corresponding to the photo-alignment pattern formed on the photo-alignment film 124. Here, the second liquid crystal alignment pattern corresponding to the photo-alignment pattern is a pattern which has the same period $\Lambda_2$ as the photo-alignment pattern and in which the direction of the optical axis of the liquid crystal compound changes while continuously rotating in the one direction of the plane.

Through the above-described steps, an optical element 110 having the second optically-anisotropic layer 126 can be manufactured.

Compared with the manufacturing method using the method for forming a photo-alignment pattern on the photo-alignment film using the photo-interference exposure method, which is described in the method for producing the optical element 10, the method for manufacturing the new optical element 110 by using the exposure method of the optical element 10 as a mask does not require complicated adjustment such as optical axis adjustment, and is very simple. In addition, as described above, since the optical element 10 having the optically-anisotropic layer having a large refractive index anisotropy is used, the photo-alignment pattern can be formed with high accuracy. As a result, the second liquid crystal alignment pattern can be formed with high accuracy.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

First, among the compounds A suitable for examples of the present invention, synthesis of liquid crystal compounds A-1 to A-7 and characteristics of the respective compounds A-1 to A-7 mentioned in the above-described specific examples will be described.

[Synthesis of Compound]

Synthesis Example 1: Synthesis of Compound A-1

The compound A-1 was synthesized according to the following scheme.

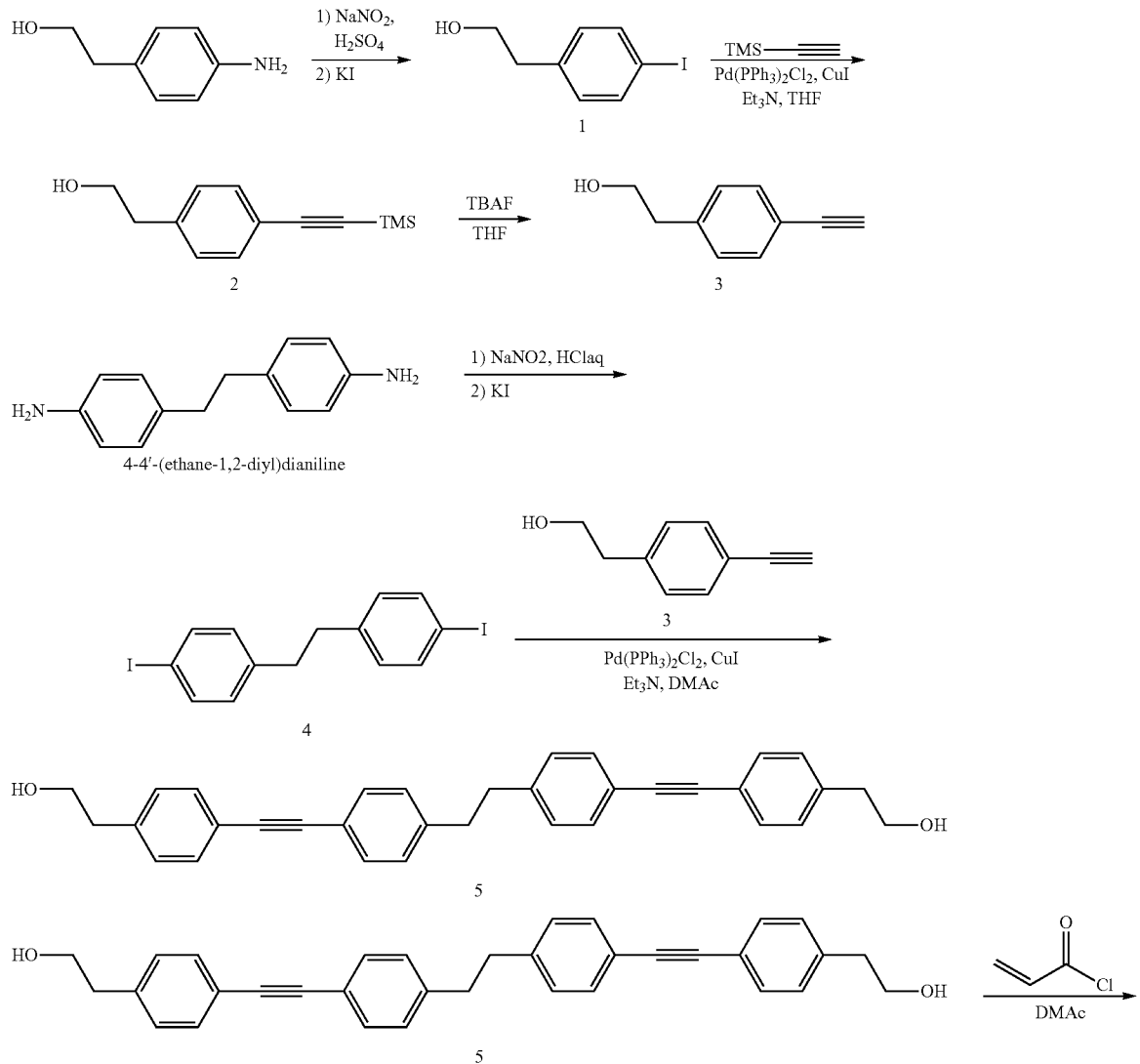

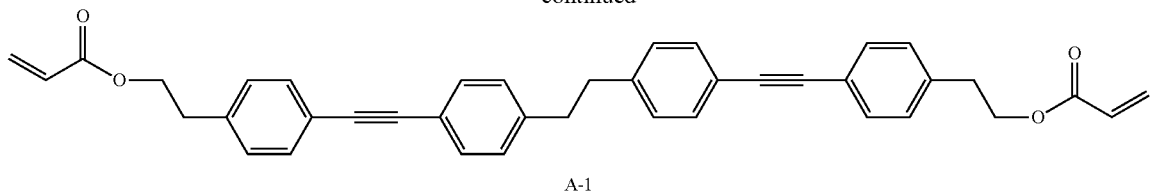

A-1

(1) Synthesis of Compound 1

4-aminophenyl-2-ethanol (132.1 g, 0.96 mol) was dissolved in water (1056 mL) and 90 mL of concentrated sulfuric acid (1.69 mol). While maintaining the temperature at 5° C. or lower, an aqueous solution of sodium nitrite (83.0 g, 1.20 mol) dissolved in water (264 mL) was added dropwise to this solution for diazotization. After that, an aqueous solution of potassium iodide (545.1 g, 3.28 mol) dissolved in water (660 mL) was added dropwise to this solution, and the mixture was stirred at room temperature for 2 hours. The obtained solution was extracted twice with ethyl acetate, and then the obtained organic phases were collected, washed with a 10 mass % aqueous solution of sodium thiosulfate and saturated saline, and dried over magnesium sulfate. After filtering the dried organic phase, the solvent was distilled off under reduced pressure, and the obtained residue was purified by flash column chromatography to obtain a pale yellow oily compound 1 (195.4 g, 0.79 mol). The yield was 81.8%.

(2) Synthesis of Compound 2

Under a nitrogen atmosphere, the compound 1 (195.4 g, 0.79 mol) and trimethylsilylacetylene (116.0 g, 1.18 mol) were dissolved in a mixed solution of tetrahydrofuran (1974 mL) and triethylamine (796.9 g, 7.88 mol). After nitrogen bubbling of the obtained solution for 30 minutes, Pd(PPh$_3$)$_2$Cl$_2$ (27.6 g, 39.4 mmol) and CuI (15.0 g, 78.8 mmol) were added to the solution, and the solution was stirred at 55° C. for 2 hours. After cooling the solution to room temperature, insoluble matters were removed from the solution by filtration. The obtained solution was washed once with saturated aqueous ammonium chloride solution and once with water and saturated saline, and dried over magnesium sulfate. After filtering the dried organic phase, the solvent was distilled off under reduced pressure, and the obtained residue was purified by flash column chromatography to obtain a pale yellow oily compound 2 (163.4 g, 0.75 mol). The yield was 94.7%.

(3) Synthesis of Compound 3

The compound 2 (163.4 g, 0.75 mol) was dissolved in tetrahydrofuran (820 mL). A 1 M tetrahydrofuran solution of tetrabutylammonium (822.9 ml, 0.82 mol) was added to the obtained solution, and the solution was stirred at room temperature for 1 hour. 1 N hydrochloric acid was added to the obtained solution, and then the mixture was extracted 4 times with ethyl acetate. The organic phase obtained by extraction was washed once with saline and dried over magnesium sulfate. After filtering the dried organic phase, the solvent was distilled off under reduced pressure, and the obtained residue was purified by flash column chromatography to obtain a pale yellow oily compound 3 (103.7 g, 0.71 mol). The yield was 94.6%.

(4) Synthesis of Compound 4

4,4'-ethylene dianiline (2.00 g, 9.42 mmol) was dissolved in 1 N hydrochloric acid water (in 113 mL). While maintaining the temperature at 5° C. or lower, an aqueous solution of sodium nitrite (1.95 g, 28.3 mmol) dissolved in water (10 mL) was added dropwise to this solution for diazotization. After that, an aqueous solution of potassium iodide (4.24 g, 28.3 mol) dissolved in water (10 mL) was added dropwise to this solution, and the mixture was stirred at room temperature for 2 hours. The precipitated solid was once filtered, washed with water, redissolved in ethyl acetate, washed with saturated saline, and dried over magnesium sulfate. After filtering the dried organic phase, the solvent was distilled off under reduced pressure, and the obtained residue was purified by flash column chromatography to obtain a compound 4 (0.45 g, 1.04 mmol). The yield was 11.0%.

(5) Synthesis of Compound 5

Under a nitrogen atmosphere, the compound 4 (0.40 g, 0.92 mmol) and the compound 3 (0.30 g, 2.05 mmol) were dissolved in a mixed solution of dimethylacetamide (10 mL) and triethylamine (0.93 g, 9.18 mmol). After nitrogen bubbling of the obtained solution for 30 minutes, Pd(PPh$_3$)$_2$Cl$_2$ (32.3 mg, 0.046 mmol) and CuI (17.5 mg, 0.092 mmol) were added to the solution, and the solution was stirred at 55° C. for 2 hours. After cooling the solution to room temperature, insoluble matters were removed from the solution by filtration. After adding water to the obtained solution and filtering the precipitated solid, the precipitated solid was suspended and washed in methanol to obtain a compound 5 (0.25 g, 0.53 mmol). The yield was 57.7%.

(6) Synthesis of Compound A-1

The compound 5 (0.25 g, 0.53 mmol) was dissolved in dimethylacetamide (10 mL). Under ice-cooling, acryloyl chloride (0.37 ml, 4.6 mmol) and triethylamine (0.64 mL, 4.6 mmol) were added thereto, and the solution was stirred at room temperature for 2 hours. 1 N hydrochloric acid was added to the obtained solution, and then the mixture was extracted with ethyl acetate. The organic phase obtained by extraction was washed once with saturated aqueous sodium hydrogen carbonate solution and saturated saline, and dried over magnesium sulfate. After filtering the dried organic phase, the solvent was distilled off under reduced pressure, and the obtained residue was purified by flash column chromatography, thereby obtaining a compound A-1 (0.18 g, 0.31 mmol). The yield was 58.7%.

The result of identification of the obtained compound A-1 using $^1$H-nuclear magnetic resonance (NMR) was as follows.

$^1$H-NMR (CDCl$_3$): δ=2.82 (t, 4H), 3.00 (t, 4H), 4.37 (t, 4H), 5.82 (d, 2H), 6.10 (dd, 2H), 6.38 (d, 2H), 7.10 (d, 4H), 7.20 (d, 4H), 7.45 (m, 8H)

Synthesis Example 2: Synthesis of Compound A-2

The compound A-2 was synthesized according to the following scheme.

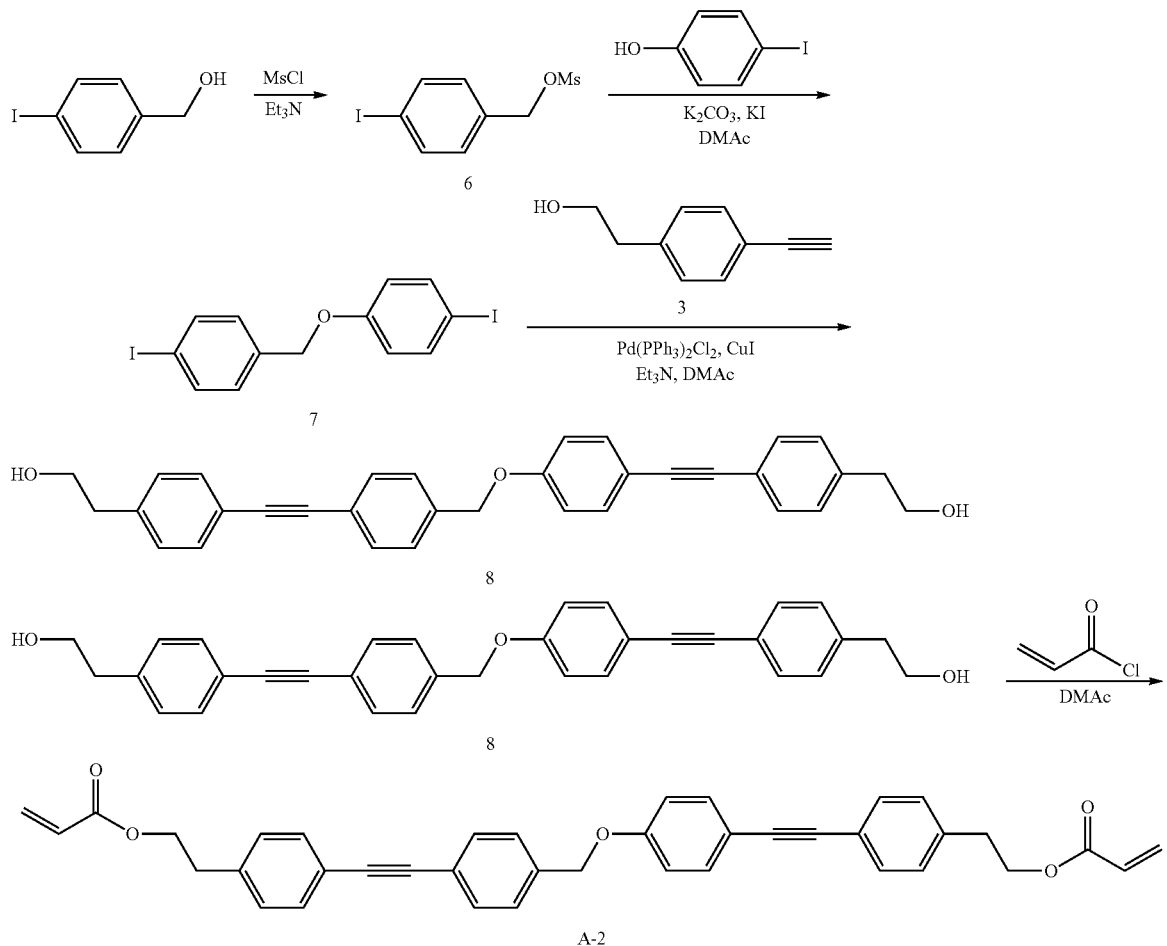

(7) Synthesis of Compound 6

4-iodobenzyl alcohol (30.0 g, 0.128 mol) was dissolved in tetrahydrofuran (150 mL) to obtain a solution. Under ice-cooling, methanesulfonyl chloride (15.4 g, 0.135 mol) and triethylamine (14.3 g, 0.141 mol) were added to the obtained solution, and the solution was stirred at room temperature for 3 hours. After adding ethyl acetate and water to the obtained solution for extraction, the organic phase was washed with water and saturated saline, and dried over magnesium sulfate. After filtering the dried organic phase, the solvent was distilled off under reduced pressure, and the obtained residue was suspended and washed by adding hexane to obtain a compound 6 (38.4 g, 0.123 mol). The yield was 96.1%.

(8) Synthesis of Compound 7

The compound 6 (5.00 g, 16.0 mmol) and 4-iodophenol (3.52 g, 16.0 mmol) were dissolved in dimethylacetamide (30 mL) to obtain a solution. Potassium carbonate (2.65 g, 19.2 mmol) and potassium iodide (0.27 g, 1.63 mmol) were added to the solution, and the mixture was stirred at 85° C. for 2 hours. After cooling the solution to room temperature, ethyl acetate and water were added to the obtained solution for extraction, and the organic phase was washed with 1 N hydrochloric acid aqueous solution, saturated aqueous sodium hydrogen carbonate solution, and saturated saline, and dried over magnesium sulfate. After filtering the dried organic phase, the solvent was distilled off under reduced pressure, and the obtained residue was suspended and washed by adding methanol to obtain a compound 7 (4.84 g, 11.1 mmol). The yield was 69.4%.

(9) Synthesis of Compound 8

A compound 8 was synthesized in the same manner as in (5), except that the compound 7 was used instead of the compound 4 in the synthesis (5) of the compound 5.

(10) Synthesis of Compound A-2

A compound A-2 was synthesized in the same manner as in (6), except that the compound 8 was used instead of the compound 5 in the synthesis (6) of the compound A-1.

The result of identification of the obtained compound A-2 using $^1$H-nuclear magnetic resonance (NMR) was as follows.

$^1$H-NMR (CDCl$_3$): δ=2.99 (t, 4H), 4.38 (t, 4H), 5.10 (s, 2H), 5.81 (d, 2H), 6.10 (dd, 2H), 6.38 (d, 2H), 6.92 (d, 2H), 7.20 (m, 4H), 7.44 (m, 8H), 7.55 (d, 2H)

Synthesis Example 3: Synthesis of Compound A-3

A compound A-3 was synthesized in the same manner as in the compound A-2, except that 2-methyl-4-iodophenol was used instead of 4-iodophenol in the synthesis of the compound A-2.

The result of identification of the obtained compound A-3 using $^1$H-NMR was as follows.

$^1$H-NMR (CDCl$_3$): δ=2.29 (s, 3H), 2.99 (t, 4H), 4.38 (t, 4H), 5.10 (s, 2H), 5.81 (d, 2H), 6.10 (dd, 2H), 6.38 (d, 2H), 6.83 (d, 1H), 7.20 (m, 4H), 7.32 (d, 2H), 7.44 (m, 6H), 7.55 (d, 2H)

Synthesis Example 4: Synthesis of Compound A-4

A compound A-4 was synthesized in the same manner as in the compound A-2, except that 2-trifluoromethyl-4-bromophenol was used instead of 4-iodophenol in the synthesis of the compound A-2.

The result of identification of the obtained compound A-4 using $^1$H-NMR was as follows.

$^1$H-NMR (CDCl$_3$): δ=2.99 (t, 4H), 4.38 (t, 4H), 5.23 (s, 2H), 5.81 (d, 2H), 6.10 (dd, 2H), 6.38 (d, 2H), 6.98 (d, 11H), 7.21 (m, 4H), 7.44 (m, 6H), 7.52 (d, 2H), 7.60 (d, 11H), 7.75 (s, 1H)

Synthesis Example 5: Synthesis of Compound A-5

A compound A-5 was synthesized in the same manner as in the compound A-2, except that 2-tertiary butyl-4-bromophenol synthesized by the following method was used instead of 4-iodophenol in the synthesis of the compound A-2.

(11) Synthesis of 2-tertiary butyl-4-bromophenol 2-tertiary butylphenol (10.0 g, 66.6 mmol) was dissolved in chloroform (100 mL) to obtain a solution. Tetrabutylammonium tribromide (38.6 g, 80.0 mmol) was added to the solution. After stirring the solution at room temperature for 1 hour, 1 N hydrochloric acid aqueous solution was added to the solution, and the solution was extracted with chloroform. The obtained organic phase was washed with 1 N hydrochloric acid aqueous solution, 10% saline, and saturated saline, and dried over magnesium sulfate. After filtering the dried organic phase, the solvent was distilled off under reduced pressure, and the obtained residue was purified by flash column chromatography to obtain 2-tertiary butyl-4-bromophenol (6.60 g, 28.8 mmol). The yield was 43.3%.

The result of identification of the obtained compound A-5 using $^1$H-NMR was as follows.

$^1$H-NMR (CDC$_3$): δ=1.40 (s, 9H), 3.00 (t, 4H), 4.38 (t, 4H), 5.13 (s, 2H), 5.81 (d, 2H), 6.10 (dd, 2H), 6.38 (d, 2H), 6.88 (d, 1H), 7.21 (m, 4H), 7.35 (d, 1H), 7.45 (m, 7H), 7.56 (d, 2H)

Synthesis Example 6: Synthesis of Compound A-6

A compound A-6 was synthesized in the same manner as in the compound A-2, except that 2-methoxycarbonyl-4-iodophenol was used instead of 4-iodophenol in the synthesis of the compound A-2.

The result of identification of the obtained compound A-6 using $^1$H-NMR was as follows.

$^1$H-NMR (CDCl$_3$): δ=2.99 (t, 4H), 3.89 (s, 3H), 4.38 (t, 4H), 5.21 (s, 2H), 5.81 (d, 2H), 6.10 (dd, 2H), 6.38 (d, 2H), 6.98 (d, 1H), 7.21 (m, 4H), 7.48 (m, 6H), 7.52 (d, 2H), 7.60 (d, 1H), 8.00 (s, 1H)

Synthesis Example 7: Synthesis of Compound A-7

A compound A-7 was synthesized in the same manner as in the compound A-2, except that 2-tertiary butoxycarbonyl-4-iodophenol synthesized by the following method was used instead of 4-iodophenol in the synthesis of the compound A-2.

(12) Synthesis of 2-tertiary butoxycarbonyl-4-iodophenol 2-carboxy-4-iodophenol (5.00 g, 18.9 mmol) and dimethylaminopyridine (0.12 g, 0.95 mmol) were dissolved in tertiary butanol (50 mL) to obtain a solution. A solution in which 1-ethyl-3-(3-dimethylaminopropyl) carbodiimide hydrochloride (5.44 g, 28.4 mmol) was dissolved in tetrahydrofuran (25 mL) was added dropwise to the solution. After stirring the solution at room temperature for 2 hours, oxalic acid (2.56 g, 28.4 mmol) was added thereto, and the mixture was further stirred for 1 hour. After removing insoluble matters by filtration, the solvent was distilled off under reduced pressure, and the obtained residue was extracted with water and ethyl acetate. The organic phase was washed with saturated aqueous sodium hydrogen carbonate solution and saturated saline, and dried over magnesium sulfate. After filtering the dried organic phase, the solvent was distilled off under reduced pressure, n-hexane was added to the obtained residue, and the precipitate was removed by filtration. The filtrate was distilled off under reduced pressure to obtain crystallized 2-tertiary butoxycarbonyl-4-iodophenol (2.70 g, 8.43 mmol). The yield was 44.6%.

The result of identification of the obtained compound A-7 using $^1$H-NMR was as follows.

$^1$H-NMR (CDCl$_3$): δ=1.55 (s, 9H), 2.99 (t, 4H), 4.38 (t, 4H), 5.17 (s, 2H), 5.81 (d, 2H), 6.10 (dd, 2H), 6.38 (d, 2H), 6.92 (d, 1H), 7.21 (m, 4H), 7.45 (m, 6H), 7.53 (m, 3H), 7.85 (s, 1H)

[Characteristic Evaluation]

The following characteristic evaluations were performed for the above-described compounds A-1 to A-7.

<Measurement of Δn (Refractive Index Anisotropy)>

Δn of each compound was measured by a method using a wedge-shaped liquid crystal cell, which is described on page 202 of Liquid Crystal Handbook (edited by the Liquid Crystal Handbook Editorial Committee, published by MARUZEN CO., LTD.). In a case of a compound which is easily crystallized, the evaluation was performed with a mixture with other liquid crystals and estimate Δn from the extrapolated value thereof. The results are shown in Table 1. The values in the table represent Δn at 550 nm and 30° C.

<Measurement of Solution Absorption Spectrum (Evaluation of Colorability)>

The solution absorption spectrum of each compound was measured using a spectrophotometer UV-3100PC manufactured by Shimadzu Corporation. A solution in which a predetermined amount of a compound was dissolved using chloroform as a solvent was measured in a 1 cm cell, and λmax and λ(1000) were calculated from the obtained spectrum and the molecular weight. λmax represents a wavelength showing the maximum light absorption coefficient in a region of 300 nm or more, and λ(1000) represents a wavelength showing 1000 of light absorption coefficient ε in a region of 300 nm or more. As the wavelengths of λmax and λ(1000) are smaller (λmax and λ(1000) are on the shortwave side), it can be evaluated that colorability of the compound is suppressed.

For example, λmax is preferably 310 nm or less. In addition, λ(1000) is preferably 350 nm or less and more preferably 325 nm or less.

The results are listed in the following table.

TABLE 1

| Compound | Molecular weight | $\Delta n_{550}$ | $\lambda$max [nm] | $\lambda(1000)$ [nm] |
|---|---|---|---|---|
| A-1 | 579 | 0.3 | 309 | 320 |
| A-2 | 581 | 0.34 | 309 | 327 |
| A-3 | 595 | 0.34 | 308 | 327 |
| A-4 | 649 | 0.36 | 309 | 325 |
| A-5 | 637 | 0.33 | 308 | 329 |
| A-6 | 639 | 0.37 | 308 | 343 |
| A-7 | 681 | 0.33 | 309 | 339 |

As shown in Table 1, it was confirmed that the compound A can achieve both high refractive index anisotropy Δn and suppression of colorability (λmax is 310 nm or less and λ(1000) is 350 nm or less).

In Formula (I), in a case where Y is —C($R_{ya}$)($R_{yb}$)—, it was confirmed that the compound of the present invention can further suppress the colorability (result of the compound A-1).

Next, examples and comparative examples of the optical element according to the embodiment of the present invention will be described.

Comparative Example 1

<Production of Optical Element>
(Support and Saponification Treatment of Support)

As the support, a commercially available triacetyl cellulose film (manufactured by Fujifilm Corporation, Z-TAC) was used.

The support was caused to pass through an induction heating roll at a temperature of 60° C. such that the support surface temperature was increased to 40° C.

Next, an alkali solution shown below was applied to a single surface of the support using a bar coater in an application amount of 14 mL (liter)/m², the support was heated to 110° C., and the support was transported for 10 seconds under a steam infrared electric heater (manufactured by Noritake Co., Ltd.).

Next, 3 mL/m² of pure water was applied to a surface of the support to which the alkali solution was applied using the same bar coater. Next, water cleaning using a foundry coater and water draining using an air knife were repeated three times, and then the support was transported and dried in a drying zone at 70° C. for 10 seconds. As a result, the alkali saponification treatment was performed on the surface of the support.

Alkali Solution

| Potassium hydroxide | 4.70 parts by mass |
| Water | 15.80 parts by mass |
| Isopropanol | 63.70 parts by mass |
| Surfactant SF-1: $C_{14}H_{29}O(CH_2CH_2O)_2OH$ | 1.0 part by mass |
| Propylene glycol | 14.8 parts by mass |

(Formation of Undercoat Layer)

The following undercoat layer-forming coating solution was continuously applied to the surface of the support on which the alkali saponification treatment was performed using a #8 wire bar. The support on which the coating film was formed was dried using warm air at 60° C. for 60 seconds and was dried using warm air at 100° C. for 120 seconds. As a result, an undercoat layer was formed.

Undercoat Layer-Forming Coating Solution

| The following modified polyvinyl alcohol | 2.40 parts by mass |
| Isopropyl alcohol | 1.60 parts by mass |
| Methanol | 36.00 parts by mass |
| Water | 60.00 parts by mass |

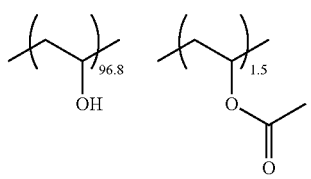

Modified polyvinyl alcohol

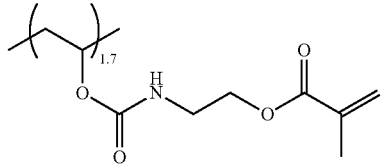

(Formation of Alignment Film)

The following alignment film-forming coating solution was continuously applied to the support on which the undercoat layer was formed using a #2 wire bar. The support on which the coating film of the alignment film-forming coating solution was formed was dried using a hot plate at 60° C. for 60 seconds. As a result, an alignment film was formed.

Alignment Film-Forming Coating Solution

| Material for photo-alignment | 1.00 part by mass |
| Water | 16.00 parts by mass |
| Butoxyethanol | 42.00 parts by mass |
| Propylene glycol monomethyl ether | 42.00 parts by mass |

—Material for Photo-Alignment—

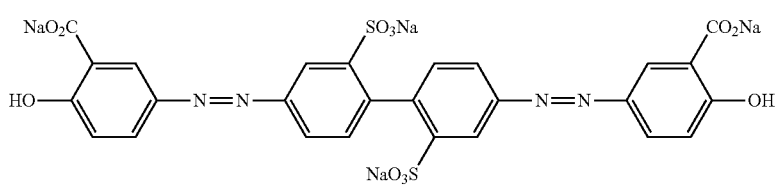

(Exposure of Alignment Film)

The alignment film was exposed using the exposure device shown in FIG. 5 to form an alignment film P-1 having an alignment pattern.

In the exposure device, a laser that emits laser light having a wavelength (325 nm) was used as the laser. The exposure dose of the interference light was 2000 mJ/cm$^2$. The single period (the length over which the optical axis derived from the liquid crystal compound rotates 180°) of an alignment pattern formed by interference of two laser beams was controlled by changing an intersection angle (intersection angle β) between the two beams.

(Formation of Optically-Anisotropic Layer)

As the composition forming the optically-anisotropic layer, the following composition E-1 was prepared.

Composition E-1

| | |
|---|---|
| Liquid crystal compound L-1 | 100.00 parts by mass |
| Polymerization initiator (IRGACURE (registered trade name) 907, manufactured by BASF SE) | 3.00 parts by mass |
| Leveling agent T-1 | 0.08 parts by mass |
| Methyl ethyl ketone | 927.7 parts by mass | where the liquid crystal layer was formed by the application of the multiple layers such that the total thickness of the liquid crystal layer was large, the alignment direction of the alignment film was reflected from a lower surface of the liquid crystal layer to an upper surface thereof.

Regarding the first liquid crystal layer, the above-described composition E-1 was applied to the alignment film P-1 to form a coating film, the coating film was heated using a hot plate at 120° C., the coating film was cooled to 60° C., and the coating film was irradiated with ultraviolet light having a wavelength of 365 nm at an irradiation dose of 2000 mJ/cm$^2$ using a high-pressure mercury lamp in a nitrogen atmosphere. As a result, the alignment of the liquid crystal compound was immobilized. At this time, the film thickness of the first liquid crystal layer was 0.3 μm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer (cured layer) was produced. This way, by repeating the application multiple times until the total thickness reached 1.8 μm, an optically-anisotropic layer was obtained, and an optical element G-1 was produced.

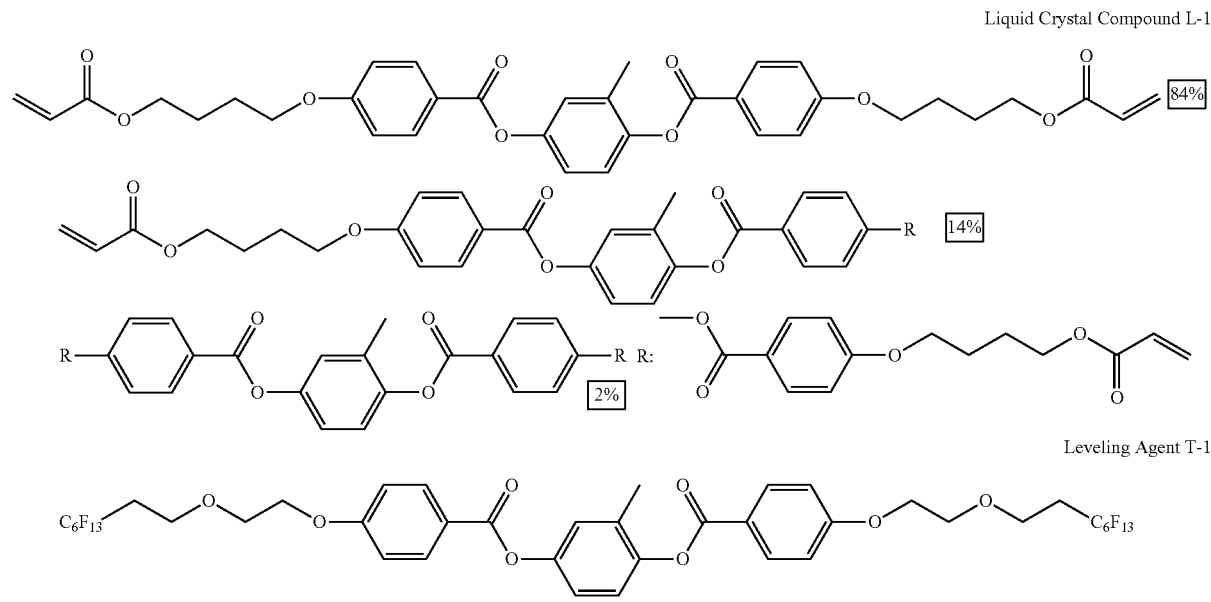

Liquid Crystal Compound L-1

Leveling Agent T-1

% is based on mass.

An optically-anisotropic layer was formed by applying the composition E-1 to the alignment film P-1 in multiple layers. The application of the multiple layers refers to repetition of the following processes including: producing a first liquid crystal immobilized layer by applying the first layer-forming composition E-1 to the alignment film, heating the composition E-1, cooling the composition E-1, and irradiating the composition E-1 with ultraviolet light for curing; and producing a second or subsequent liquid crystal immobilized layer by applying the second or subsequent layer-forming composition E-1 to the formed liquid crystal immobilized layer, heating the composition E-1, cooling the composition E-1, and irradiating the composition E-1 with ultraviolet light for curing as described above. Even in a case The complex refractive index $\Delta n_{550}$ of the cured layer of the composition E-1 was 0.16. The complex refractive index $\Delta n_{550}$ was obtained by applying the composition E-1 onto a separately prepared support with an alignment film for measuring retardation, horizontally aligning a director (optical axis) of the liquid crystal compound to the surface of the support, immobilizing the director with an ultraviolet irradiation, and measuring a retardation value and a film thickness of the liquid crystal immobilized layer (cured layer). $\Delta n_{550}$ can be calculated by dividing the retardation value by the film thickness. The retardation value was measured at a wavelength of 550 nm using Axoscan (manufactured by Axometrix Inc.), and the film thickness was measured using a scanning electron microscope (SEM). Hereinafter, the retardation value was appropriately measured at the target wavelength.

The $\Delta n_{550} \times$ thickness (=Re(550)) of the optically-anisotropic layer of this example was 280 nm. Hereinafter, unless specified otherwise, "$\Delta n_{550} \times d$" and the like were measured in the same manner as described above.

Comparative Example 2

As shown in Table 1, an optical element G-2 was produced in the same manner as in Comparative Example 1, except that the film thickness was 0.9 μm.

Comparative Example 3

As shown in Table 1, an optical element G-3 was produced in the same manner as in Comparative Example 1, except that the intersecting angle of the alignment film during exposure was adjusted such that the period Λ of the liquid crystal alignment pattern was 2.00 μm.

Examples 1 to 6

Optical elements G-4 to G-9 were produced in the same manner as in Comparative Example 1, except that each of the above-described liquid crystal compounds A-2 to A-7 was used instead of the liquid crystal compound L-1.

Example 7

An optical element G-9-2 was produced in the same manner as in Comparative Example 6, except that the intersecting angle of the alignment film during exposure was adjusted such that the period Λ of the liquid crystal alignment pattern was 1.60 μm.

Reference Example 1

An optical element G-9-3 was produced in the same manner as in Comparative Example 6, except that the intersecting angle of the alignment film during exposure was adjusted such that the period Λ of the liquid crystal alignment pattern was 2.00 μm.

Example 8

An optical element G-10 was produced in the same manner as in Comparative Example 1, except that the liquid crystal compound B-1 described below was used instead of the liquid crystal compound L-1.

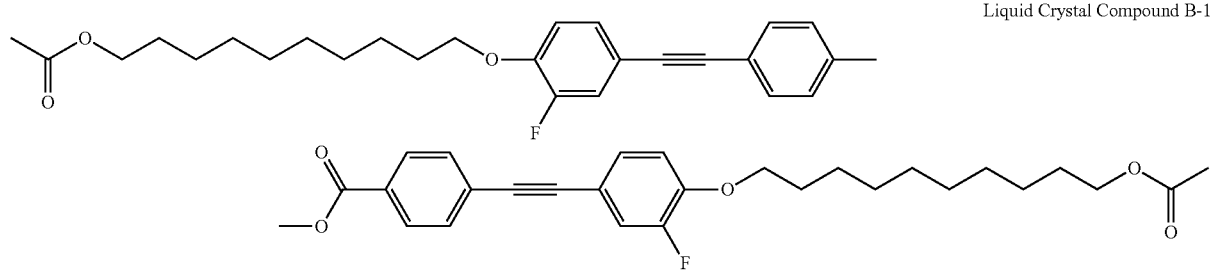

Liquid Crystal Compound B-1

The liquid crystal compound B-1 was synthesized according to Synthesis Example 1 of JP2005-015406A.

The following evaluations were performed on the above-described optical elements of Examples 1 to 8, Reference Example 1, and Comparative Examples 1 to 3.

<Measurement of Diffraction Angle and Diffraction Efficiency>

The diffraction angle and the diffraction efficiency were determined as follows.

A light source device 100 which outputs a laser light L having an output center wavelength of 530 nm was installed such that the laser light L was perpendicularly incident on one surface of an optical element S (refer to FIG. 11), and a screen was placed parallel to the other surface at a position 100 cm away from the other surface of the optical element S. The laser light L output from the light source device 100 was incident on the one surface of the optical element S perpendicularly, that is, at an angle of 0° with respect to the normal line, and the transmitted light was captured on a screen. The emission angle θ of the transmitted light was obtained from the position of the transmitted light on this screen. The emission angle θ of the transmitted light is the diffraction angle θ, and is also referred to as the transmission angle θ.

Figure 11:
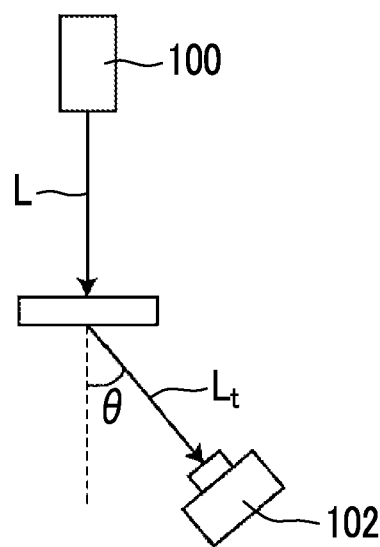
FIG. 11 is a conceptual view for explaining a method of measuring an intensity of light.

Next, as shown in FIG. 11, a photodetector 102 was installed at a position where the transmitted light could be collected, and light intensity of the transmitted light Lt transmitted at the transmission angle θ was measured by the photodetector 102. A ratio between the light intensity of the transmitted light Lt and the light intensity of the incidence light (light L) was obtained to determine the value of the relative light intensity of the transmitted light Lt relative to the incidence light (laser light L) (transmitted light Lt/laser light L). The diffraction efficiency was defined as (value of the relative light intensity of the transmitted light Lt relative to the incidence light)×100 [%].

The light intensity was measured by incidenting a circularly polarized laser light as the incidence light L into the optical elements S of Examples and Comparative Examples, the circularly polarized laser light being a circularly polarized light obtained after a laser light output from the light source is perpendicularly incident on a circularly polarizing plate corresponding to a wavelength thereof.

<Measurement of Solution Absorption Spectrum (Evaluation of Colorability)>

The solution absorption spectrum of each compound was measured using a spectrophotometer UV-3100PC manufactured by Shimadzu Corporation. A solution in which a predetermined amount of a compound was dissolved using chloroform as a solvent was measured in a 1 cm cell, and $\lambda_{max}$ and $\lambda(1000)$ were calculated from the obtained spectrum and the molecular weight. $\lambda_{max}$ represents a wavelength showing the maximum light absorption coefficient in a region of 250 nm to 700 nm, and $\lambda(1000)$ is a tail region on the long-wavelength side of peaks at which a molar light absorption coefficient ε shows the maximum value in the absorption spectrum, and represents a wavelength showing 1000 of the molar light absorption coefficient ε. As the wavelengths of $\lambda_{max}$ and $\lambda(1000)$ are smaller ($\lambda_{max}$ and $\lambda(1000)$ are on the shortwave side), it can be evaluated that colorability of the compound is suppressed.

For example, $\lambda_{max}$ is preferably 310 nm or less. In addition, $\lambda(1000)$ is preferably 350 nm or less and more preferably 325 nm or less.

Regarding optical elements of Examples 1 to 7 and Comparative Examples 1 to 3, the configurations of optically-anisotropic layer and the evaluation results are summarized in Table 2.

efficiency is greatly reduced in a case where the period Λ of the alignment pattern is as small as 1.0 μm as in Comparative Examples 1 and 2.

Furthermore, examples and comparative examples relating to a method for manufacturing a second optical element using examples and comparative examples of the optical element according to the embodiment of the present invention will be described.

Example 9

<Production of Optical Element as Birefringence Mask>

As a birefringence mask, an optical element G-11 was produced. At this time, the following composition was used as a composition forming the optically-anisotropic layer.

| | |
|---|---|
| Liquid crystal compound A-6 | 100.00 parts by mass |
| Polymerization initiator | 3.00 parts by mass |
| (IRGACURE (registered trade name) | |
| 907, manufactured by BASF SE) | |
| Leveling agent T-1 | 0.08 parts by mass |
| Methyl ethyl ketone | 1369.5 parts by mass |

The in-plane retardation of the optically-anisotropic layer (first optically-anisotropic layer) of the birefringence mask

TABLE 2

| | | | Optically-anisotropic layer | | | | | Evaluation | | | |
|---|---|---|---|---|---|---|---|---|---|---|---|
| | Optical element | Liquid crystal compound | Period Λ of liquid crystal alignment pattern [μm] | Film thickness d [μm] | Re(550) [nm] | $\Delta n_{550}$ | Λ/d | Diffraction angle [deg.] | Diffraction efficiency | $\lambda$max [nm] | $\lambda(1000)$ [nm] |
| Comparative Example 1 | G-1 | L-1 | 1.00 | 1.8 | 280 | 0.16 | 0.57 | 33 | 59% | 263 | 300 |
| Comparative Example 2 | G-2 | L-1 | 1.00 | 0.9 | 140 | 0.16 | 1.14 | 33 | 46% | 263 | 300 |
| Comparative Example 3 | G-3 | L-1 | 2.00 | 1.8 | 280 | 0.16 | 1.14 | 16 | 97% | 263 | 300 |
| Example 1 | G-4 | A-2 | 1.00 | 0.9 | 208 | 0.24 | 1.15 | 33 | 75% | 309 | 327 |
| Example 2 | G-5 | A-3 | 1.00 | 0.9 | 260 | 0.30 | 1.15 | 33 | 86% | 308 | 327 |
| Example 3 | G-6 | A-4 | 1.00 | 0.9 | 260 | 0.30 | 1.15 | 33 | 86% | 309 | 325 |
| Example 4 | G-7 | A-5 | 1.00 | 0.9 | 225 | 0.26 | 1.15 | 33 | 81% | 308 | 329 |
| Example 5 | G-8 | A-6 | 1.00 | 0.9 | 260 | 0.30 | 1.15 | 33 | 86% | 308 | 343 |
| Example 6 | G-9 | A-7 | 1.00 | 0.9 | 234 | 0.27 | 1.15 | 33 | 83% | 309 | 339 |
| Example 7 | G-9-2 | A-7 | 1.60 | 0.9 | 234 | 0.27 | 1.85 | 20 | 95% | 309 | 339 |
| Reference Example 1 | G-9-3 | A-7 | 2.00 | 0.9 | 234 | 0.27 | 2.31 | 16 | 97% | 309 | 339 |
| Example 8 | G-10 | B-1 | 1.00 | 0.9 | 220 | 0.24 | 1.09 | 33 | 78% | 315 | 364 |

As shown in the above-described evaluation results, all the optical elements of Examples 1 to 8 and Reference Example 1, which satisfy 0.24 or more of the refractive index anisotropy Δn of the optically-anisotropic layer, has a good diffraction efficiency of 75% or more. As the period Λ of the liquid crystal alignment pattern is smaller, the diffraction angle is larger and the diffraction efficiency tends to decrease, but good diffraction efficiency is obtained even at a large diffraction angle of 33°. In particular, in a case where the refractive index anisotropy Δn is 0.3 or more, a particularly preferred diffraction efficiency is obtained.

On the other hand, in the optical elements of Comparative Examples 1 to 3, which have a small refractive index anisotropy Δn of the optically-anisotropic layer, good diffraction efficiency is obtained in a case where the period is large as in Comparative Example 3, but the diffraction (optical element G-11) was set to be half a wavelength with respect to the exposure wavelength of 365 nm. The film thickness of the first optically-anisotropic layer in the optical element G-11 was 0.5 μm. In addition, in the first liquid crystal alignment pattern of the first optically-anisotropic layer, the single period over which the optical axis derived from the liquid crystal compound rotated 180° was set to 1.6 μm. Other than that, the optical element G-11 was produced in the same manner as the optical element G-8 of Example 5.

<Production of Second Optical Element>

The steps up to the support, the saponification treatment of the support, and the formation of the alignment film were the same as those of the above-described optical element of Example 1.

(Exposure of Alignment Film)

On the obtained alignment film, the optical element G-11 produced as a birefringence mask was arranged such that the optically-anisotropic layer is in contact with the alignment film.

In this state, through the birefringence mask, the coating film was irradiated with ultraviolet light having a wavelength of 365 nm at an irradiation dose of 2000 mJ/cm$^2$ using a high-pressure mercury lamp, and as a result, a pattern corresponding to the alignment pattern produced by the birefringence mask was transferred onto the alignment film. More specifically, ultraviolet light emitted from a high-pressure mercury lamp was converted into parallel light through a parallel louver, and the parallel light was further transmitted through a linear polarizer and incident on the birefringence mask as linearly polarized light on the polarization axis along the transmission axis of the linear polarizer.

A new optical element G-12 was produced in the same manner as in the manufacturing process of the optical element of Example 5 for forming the optically-anisotropic layer on the patterned alignment film.

Regarding the optical element G-12, the diffraction angle and the diffraction efficiency were determined in the same

| Liquid crystal compound L-1 | 100.00 parts by mass |
| --- | --- |
| Polymerization initiator (IRGACURE (registered trade name) 907, manufactured by BASF SE) | 3.00 parts by mass |
| Leveling agent T-1 | 0.08 parts by mass |
| Methyl ethyl ketone | 1369.5 parts by mass |

The in-plane retardation of the optically-anisotropic layer of the birefringence mask (optical element G-13) was set to be half a wavelength with respect to the exposure wavelength of 365 nm. The film thickness of the optically-anisotropic layer in the optical element G-13 was 0.8 µm.

Other than that, an optical element G-14 of Comparative Example 4 was produced in the same manner as the optical element of Example 9.

The configurations of the first optical element as the birefringence mask of Example 9 and Comparative Example 4 and the second optical element produced using the mask, and the evaluations are summarized in Table 3.

TABLE 3

| | | | First optically-anisotropic layer | |
| --- | --- | --- | --- | --- |
| Production of mask | First optical element (birefringence mask) | First liquid crystal compound | Period $\Lambda_1$ of first liquid crystal alignment pattern [µm] | Film thickness $d_1$ [µm] |
| Example 9 | G-11 | A-6 | 1.60 | 0.5 |
| Comparative Example 4 | G-13 | L-1 | 1.60 | 0.8 |

| | | | Second optically-anisotropic layer | | | | | | |
| --- | --- | --- | --- | --- | --- | --- | --- | --- | --- |
| Manufacturing optical element using mask | Second optical element | Second liquid crystal compound | Period $\Lambda_2$ of second liquid crystal alignment pattern [µm] | Film thickness $d_2$ [µm] | Re(550) [nm] | $\Delta n_{550}$ | $\Lambda/d$ | Diffraction angle [deg.] | Diffraction efficiency |
| Example 9 | G-12 | A-6 | 0.80 | 0.9 | 260 | 0.30 | 0.92 | 43 | 86% |
| Comparative Example 4 | G-14 | A-6 | — | 0.9 | 260 | 0.30 | — | — | — | manner as in Examples 1 to 7. As a second liquid crystal alignment pattern, it was possible to easily obtain the new optical element (second optical element) G-12 having a pattern with a period half the period of the first liquid crystal alignment pattern of the optical element G-11 used as a mask, and as a result, a liquid crystal diffraction pattern having a very small period could be obtained and a large diffraction angle exceeding 400 could be obtained. In addition, high diffraction efficiency could be obtained even at a large diffraction angle exceeding 40°.

Comparative Example 4

<Production of Birefringence Mask>

An optical element G-13 used as a birefringence mask was produced. At this time, the following composition was used as a composition forming the optically-anisotropic layer.

In Comparative Example 4, in a case where the new optical element G-14 manufactured using the optical element G-13 as a mask was observed with a polarizing microscope, no periodicity was observed in the alignment direction. That is, in the optical element G-13, the second liquid crystal alignment pattern corresponding to the first liquid crystal alignment pattern could not be formed. Although the reason is not clear, but it is assumed that, since the film thickness of the mask layer is thick, the correct optical image was not transferred onto the alignment film due to the effects of light diffraction and diffusion within the mask layer.

The entirety of the disclosure of JP2018-141677 filed on Jul. 27, 2018 is incorporated in the present specification by reference.

All documents, patent applications, and technical standards described in the present specification are incorporated herein by reference to the same extent as in a case of being specifically and individually noted that individual documents, patent applications, and technical standards are incorporated by reference.

What is claimed is:

1. An optical element comprising:
a first optically-anisotropic layer consisting of a cured layer of a composition including a first liquid crystal compound,
wherein the first optically-anisotropic layer has 0.24 or more of a refractive index anisotropy $\Delta n_{550}$ which is measured with light having a wavelength of 550 nm,
the first optically-anisotropic layer has a first liquid crystal alignment pattern in which a direction of an optical axis derived from the first liquid crystal compound continuously changes rotationally in at least one in-plane direction, and
in the first liquid crystal alignment pattern, in a case where a length $\Lambda$ over which the direction of the optical axis rotates 180° in a plane is defined as a single period, the length $\Lambda$ of the single period is 1.6 μm or less,
wherein the first liquid crystal compound is a compound represented by Formula (I),

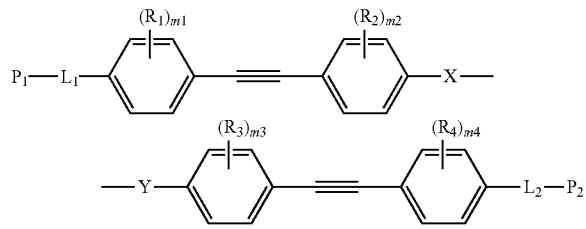

Formula (I)

in Formula (I), $P_1$ and $P_2$ each independently represent a polymerizable group,
$L_1$ and $L_2$ each independently represent a single bond or a divalent linking group,
X represents —$CH_2$—,
Y represents —$CH_2$— or —O—,
$R_1$ to $R_4$ each independently represent a substituent,
$m_1$ to $m_4$ each independently represent an integer of 0 to 4, and
in a case where $R_1$ to $R_4$ are each present in plurality, $R_1$'s to $R_4$'s each may be the same or different from each other.

2. The optical element according to claim 1, wherein the length $\Lambda$ of the single period is 1 μm or less.

3. The optical element according to claim 1, wherein a film thickness d of the first optically-anisotropic layer is 1 μm or less.

4. The optical element according to claim 1, wherein the first optically-anisotropic layer has 310 nm or less of a wavelength $\lambda_{max}$ at which a maximum molar light absorption coefficient is exhibited, and 350 nm or less of a wavelength $\lambda(1000)$ at which 1000 of a molar light absorption coefficient is exhibited.

5. The optical element according to claim 1, wherein the first liquid crystal compound is cholesterically aligned in a thickness direction.

6. An optical element comprising:
a first optically-anisotropic layer consisting of a cured layer of a composition including a first liquid crystal compound,
wherein the first optically-anisotropic layer has 0.24 or more of a refractive index anisotropy $\Delta n_{550}$ which is measured with light having a wavelength of 550 nm,
the first optically-anisotropic layer has a first liquid crystal alignment pattern in which a direction of an optical axis derived from the first liquid crystal compound continuously changes rotationally in at least one in-plane direction, and
wherein the first liquid crystal compound is a compound represented by Formula (I),

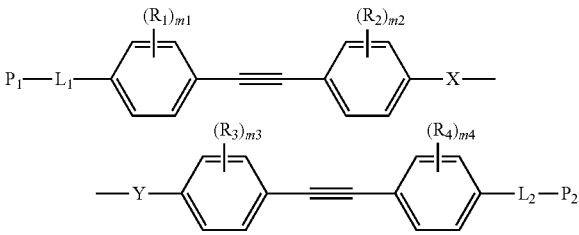

Formula (I)

in Formula (I), $P_1$ and $P_2$ each independently represent a polymerizable group,
$L_1$ and $L_2$ each independently represent a single bond or a divalent linking group,
X represents —$CH_2$—,
Y represents —$CH_2$— or —O—,
$R_1$ to $R_4$ each independently represent a substituent,
$m_1$ to $m_4$ each independently represent an integer of 0 to 4, and
in a case where $R_1$ to $R_4$ are each present in plurality, $R_1$'s to $R_4$'s each may be the same or different from each other.

7. The optical element according to claim 6, wherein in the first liquid crystal alignment pattern, in a case where a length $\Lambda$ over which the direction of the optical axis rotates 180° in a plane is defined as a single period, the length $\Lambda$ of the single period and a film thickness d of the first optically-anisotropic layer satisfy the following relationship:

$1 \leq \Lambda/d \leq 1.85$.

* * * * *